(12) United States Patent
Kim et al.

(10) Patent No.: US 12,431,050 B2
(45) Date of Patent: Sep. 30, 2025

(54) ELECTRONIC DEVICE COMPRISING EXPANDABLE DISPLAY, AND USER INTERFACE PROVISION METHOD

(71) Applicant: SAMSUNG ELECTRONICS CO., LTD., Suwon-si (KR)

(72) Inventors: Youngrog Kim, Suwon-si (KR); Jihea Park, Suwon-si (KR); Junghyeob Lee, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/789,719

(22) Filed: Jul. 31, 2024

(65) Prior Publication Data

US 2024/0386822 A1 Nov. 21, 2024

Related U.S. Application Data

(63) Continuation of application No. PCT/KR2023/002700, filed on Feb. 27, 2023.

(30) Foreign Application Priority Data

Mar. 22, 2022 (KR) .......................... 10-2022-0035615
Jul. 13, 2022 (KR) .......................... 10-2022-0086093

(51) Int. Cl.
| | | |
|---|---|---|
| G09G 3/00 | (2006.01) | |
| G06F 3/02 | (2006.01) | |
| H04M 1/02 | (2006.01) | |

(52) U.S. Cl.
CPC ............... *G09G 3/035* (2020.08); *G06F 3/02* (2013.01); *G09G 2354/00* (2013.01); *H04M 1/0237* (2013.01); *H04M 1/0268* (2013.01)

(58) Field of Classification Search
CPC ...... G09G 3/035; G09G 2354/00; G06F 3/02; G06F 2203/04803; G06F 1/1652;
(Continued)

(56) References Cited

U.S. PATENT DOCUMENTS

| | | |
|---|---|---|
| 8,666,455 B2 | 3/2014 | Song |
| 9,262,059 B2 | 2/2016 | Kim et al. |

(Continued)

FOREIGN PATENT DOCUMENTS

| | | |
|---|---|---|
| CN | 111061406 A | 4/2020 |
| KR | 20160139643 A | 12/2016 |

(Continued)

OTHER PUBLICATIONS

International Search Report mailed Jun. 1, 2023 for PCT/KR2023/002700.

(Continued)

*Primary Examiner* — Rodney Amadiz
(74) *Attorney, Agent, or Firm* — CANTOR COLBURN LLP

(57) ABSTRACT

An electronic device according to various embodiments of this document may include a first housing, a second housing coupled to slide relative to the first housing, a rollable display in which a display area is reduced or extended based on sliding-in or sliding-out of the second housing, and a processor operatively coupled to the rollable display, wherein the processor may be configured to display a screen of a running application on the rollable display when the rollable display is in a first state, detect an input for switching the rollable display from the first state to the second state, in response to the input, and determine whether or not a screen state of the running application is able to be maintained when switching the state of the rollable display.

20 Claims, 23 Drawing Sheets

(58) Field of Classification Search
CPC ...... G06F 1/1677; G06F 9/451; G06F 3/0484; H04M 1/0237; H04M 1/0268; H04M 1/0235; H04M 1/0241; H04M 1/72454
See application file for complete search history.

(56) References Cited

U.S. PATENT DOCUMENTS

| | | | |
|---|---|---|---|
| 10,114,418 | B2 | 10/2018 | Shin et al. |
| 10,424,272 | B2 | 9/2019 | Yoon et al. |
| 10,488,947 | B2 | 11/2019 | Kwon et al. |
| 10,990,208 | B2 | 4/2021 | Jung et al. |
| 11,244,658 | B1 | 2/2022 | Hong et al. |
| 11,360,665 | B2 | 6/2022 | Jung et al. |
| 2010/0167791 | A1* | 7/2010 | Lim ...................... G06F 1/1624 455/566 |
| 2013/0328878 | A1* | 12/2013 | Stahl ...................... G09G 5/005 345/1.3 |
| 2014/0340299 | A1 | 11/2014 | Lee et al. |
| 2016/0378270 | A1 | 12/2016 | Lee et al. |
| 2021/0191558 | A1 | 6/2021 | Jung et al. |
| 2022/0035513 | A1 | 2/2022 | Kang et al. |
| 2022/0329687 | A1* | 10/2022 | Kim ...................... H04M 1/0268 |
| 2023/0016622 | A1* | 1/2023 | Gudivada ............. G06F 1/1624 |
| 2023/0141581 | A1* | 5/2023 | Kim ...................... G06F 1/1677 455/575.4 |
| 2023/0164262 | A1 | 5/2023 | Yoon et al. |
| 2024/0098173 | A1* | 3/2024 | Wu ................... H04M 1/72409 |

FOREIGN PATENT DOCUMENTS

| | | |
|---|---|---|
| KR | 20160150533 A | 12/2016 |
| KR | 20170000553 A | 1/2017 |
| KR | 20170062327 A | 6/2017 |
| KR | 20170083404 A | 7/2017 |
| KR | 101789625 B1 | 10/2017 |
| KR | 20190128843 A | 11/2019 |
| KR | 20210026194 A | 3/2021 |
| KR | 102289412 B1 | 8/2021 |
| KR | 20220012142 A | 2/2022 |
| KR | 20220066799 A | 5/2022 |

OTHER PUBLICATIONS

European Notice of Allowance for EP Application No. 23710180.3 mailed on Jan. 16, 2025, citing the above reference(s).
The extended European search report for EP Application No. 25176603.6 issued on Aug. 5, 2025, citing the above reference(s).

* cited by examiner

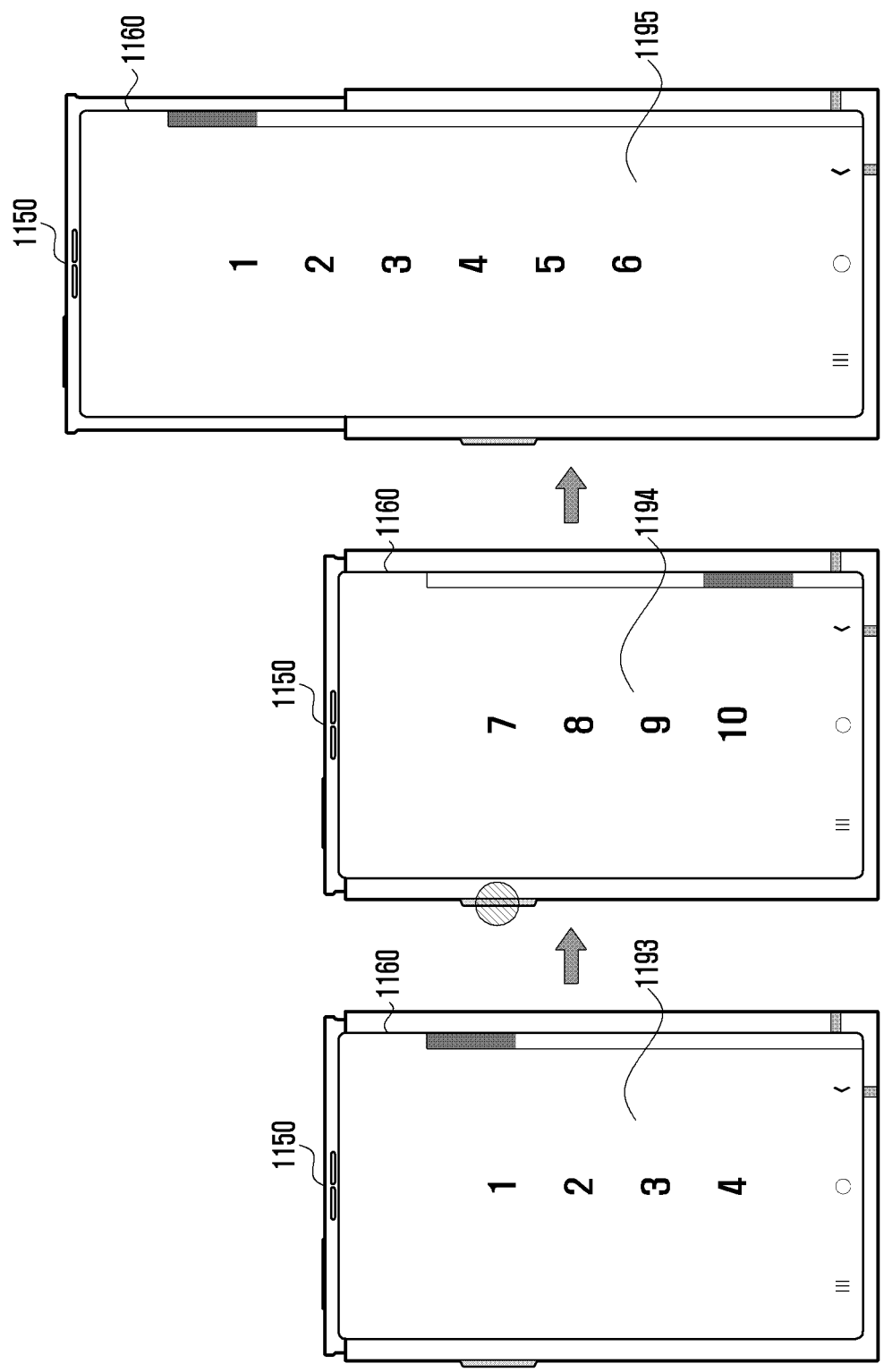

ELECTRONIC DEVICE COMPRISING EXPANDABLE DISPLAY, AND USER INTERFACE PROVISION METHOD

CROSS-REFERENCE TO RELATED APPLICATIONS

This application is a continuation application of International Application No. PCT/KR2023/002700 designating the United States, filed on Feb. 27, 2023, in the Korean Intellectual Property Receiving Office and claiming priority to Korean Patent Application No. 10-2022-0035615, filed on Mar. 22, 2022, and of a Korean patent application number 10-2022-0086093, filed on Jul. 13, 2022, in the Korean Intellectual Property Office, the disclosure of each of which is incorporated by reference herein in its entirety.

TECHNICAL FIELD

This document relates to an electronic device and, for example, to an electronic device including a flexible display of which the display area is able to be expanded.

BACKGROUND ART

A portable electronic device (hereinafter, an electronic device) such as a tablet PC or a smartphone may provide a user experience through various applications. To this end, the electronic device may include a display for providing various applications and multimedia content. Recently, electronic devices having displays of various form factors have been developed to provide various user experiences and satisfy spatial efficiency. For example, the electronic device may be equipped with an extendable display, such as a slidable or rollable display.

In an electronic device including the extendable display described above, only a portion of the entire display may be exposed to the outside, and the remaining portions thereof may be exposed to the outside by a driving motor and/or a physical force from a user so that a display area capable of being recognized by the user may be increased or conversely reduced.

DISCLOSURE OF INVENTION

Technical Problem

Some of the applications executed in the electronic device may be configured to be re-executed when the size of the display is changed. For example, if the display is extended in a reduced state or reduced in an extended state, a running application may be terminated and then re-executed. Such a re-execution operation may cause the context of the application previously manipulated by the user to be initialized, failing to remain, which makes it difficult to provide continuity of user experience when the display is extended or reduced.

Various embodiments of this document are to provide an electronic device and a method for providing a user interface in the electronic device, which may provide a user interface for re-executing an application when a display area is extended or reduced in an electronic device including an extendable display, thereby ensuring continuity of user experience.

Solution to Problem

An electronic device according to various embodiments may include a first housing, a second housing coupled to slide relative to the first housing, a rollable display in which a display area is reduced or extended based on sliding-in or sliding-out of the second housing, and a processor operatively coupled to the rollable display, wherein the processor may be configured to display a screen of a running application on the rollable display when the rollable display is in a first state, detect an input for switching the rollable display from the first state to the second state, in response to the input, determine whether or not a screen state of the running application is able to be maintained when switching the state of the rollable display, and if the application is unable to maintain the screen state of the running application when switching the state of the rollable display as a result of the determination, display a graphic element indicating switching of the state of the rollable display on the rollable display.

Advantageous Effects of Invention

According to various embodiments of this document, it is possible to provide a user interface for re-executing an application when a display area is extended or reduced in an electronic device including an extendable display, thereby providing continuity of user experience.

BRIEF DESCRIPTION OF DRAWINGS

FIGS. 11A to 11C illustrate examples of an application that is re-executed when a display is changed.

MODE FOR THE INVENTION

Figure 1:
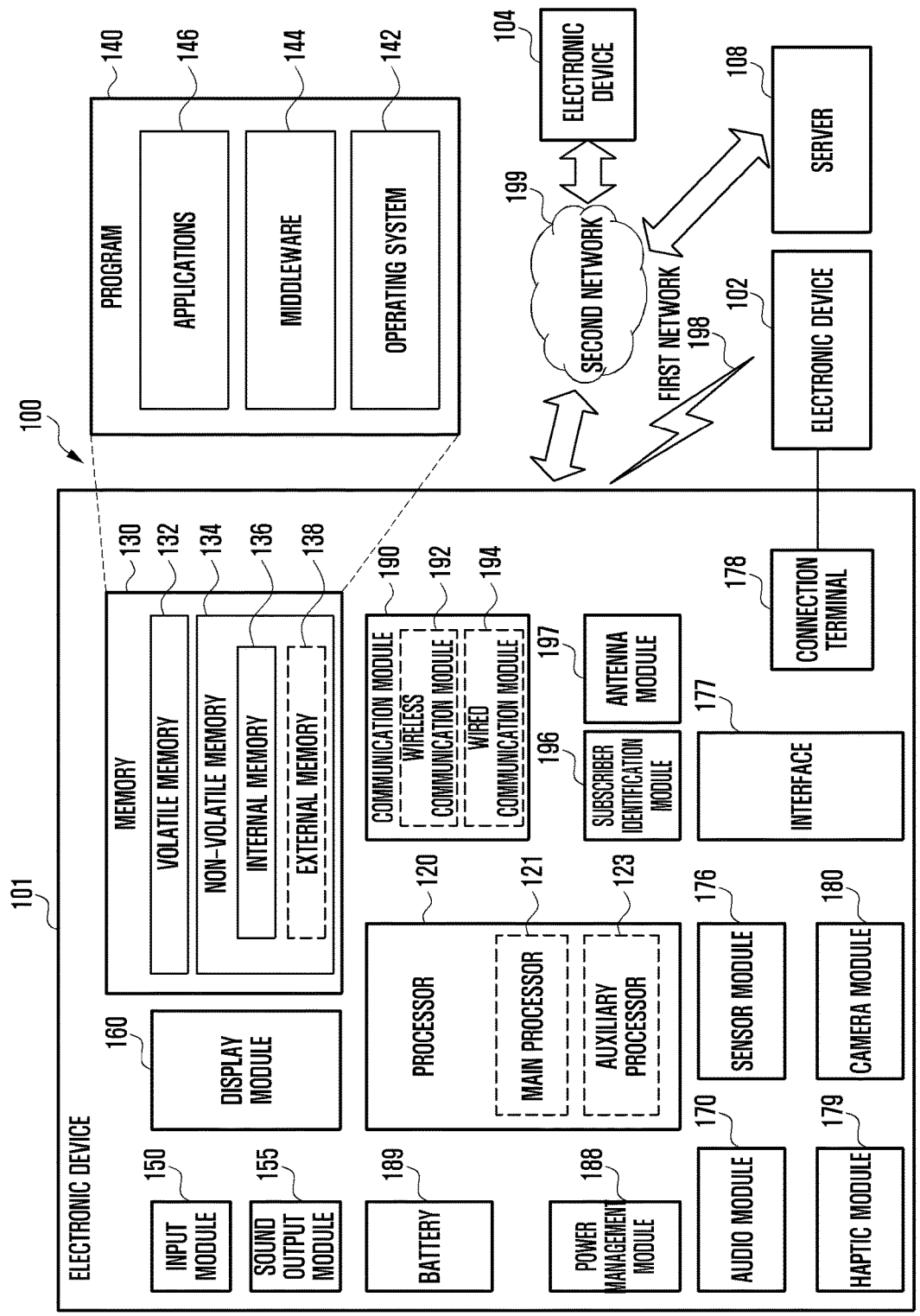
FIG. 1 illustrates a block diagram of an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
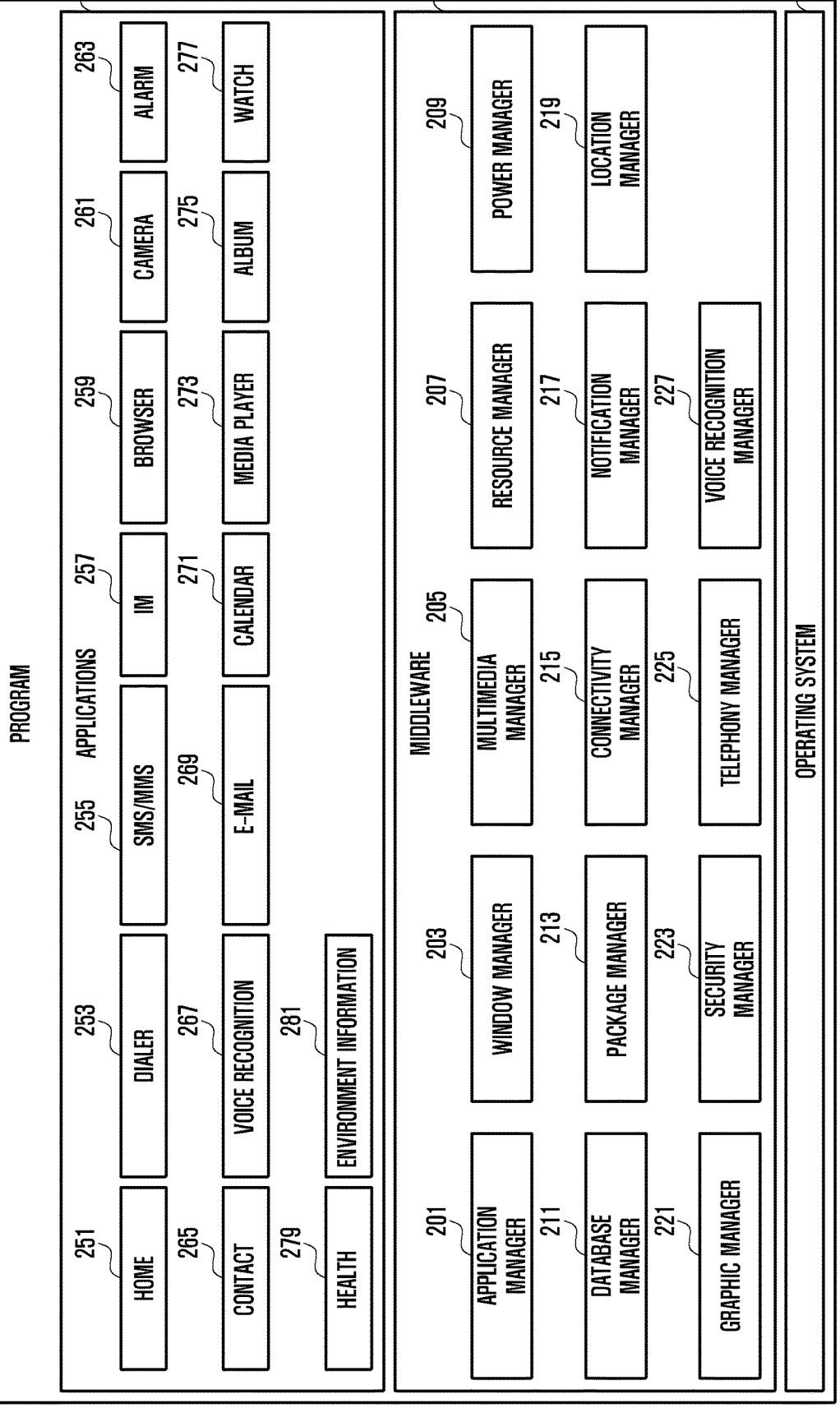
FIG. 2 is a block diagram illustrating programs according to various embodiments.

FIG. 2 is a block diagram 200 illustrating the program 140 according to various embodiments. According to an embodiment, the program 140 may include an operating system (OS) 142 to control one or more resources of the electronic device 101, middleware 144, or an application 146 executable in the OS 142. The OS 142 may include, for example, Android™, iOS™, Windows™, Symbian™, Tizen™, or Bada™. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocating or deallocation) of one or more system resources (e.g., process, memory, or power source) of the electronic device 101. The OS 142, additionally or alternatively, may include one or more driver programs to drive other hardware devices of the electronic device 101, for example, the input module 150, the sound output module 155, the display module 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227.

The application manager 201, for example, may manage the life cycle of the application 146. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189, and determine or provide related information to be used for the operation of the electronic device 101 based at least in part on corresponding information of the capacity, temperature, or power of the battery 189. According to an embodiment, the power manager 209 may interwork with a basic input/output system (BIOS) (not shown) of the electronic device 101.

The database manager 211, for example, may generate, search, or change a database to be used by the application 146. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, message, or alert). The location manager 219, for example, may manage locational information on the electronic device 101. The graphic manager 221, for example, may manage one or more graphic effects to be offered to a user or a user interface related to the one or more graphic effects.

The security manager 223, for example, may provide system security or user authentication. The telephony manager 225, for example, may manage a voice call function or a video call function provided by the electronic device 101. The voice recognition manager 227, for example, may transmit a user's voice data to the server 108, and receive, from the server 108, a command corresponding to a function to be executed on the electronic device 101 based at least in part on the voice data, or text data converted based at least in part on the voice data. According to an embodiment, the middleware 244 may dynamically delete some existing components or add new components. According to an embodiment, at least part of the middleware 144 may be included as part of the OS 142 or may be implemented as another software separate from the OS 142.

The application 146 may include, for example, a home 251, dialer 253, short message service (SMS)/multimedia messaging service (MMS) 255, instant message (IM) 257, browser 259, camera 261, alarm 263, contact 265, voice recognition 267, email 269, calendar 271, media player 273, album 275, watch 277, health 279 (e.g., for measuring the degree of workout or biometric information, such as blood sugar), or environmental information 281 (e.g., for measuring air pressure, humidity, or temperature information) application. According to an embodiment, the application 146 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of the external electronic device or some component thereof (e.g., a display module or a camera module of the external electronic device). The device management application, additionally or alternatively, may support installation, delete, or update of an application running on the external electronic device.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Hereinafter, a structure of an electronic device including a display that is extendable in a transverse direction, that is, extendable to the left or right, based on a longitudinal direction (or a portrait type) of the electronic device will be described with reference to FIGS. 3A, 3B, 4A, 4B, and 5.

Figure 3A:
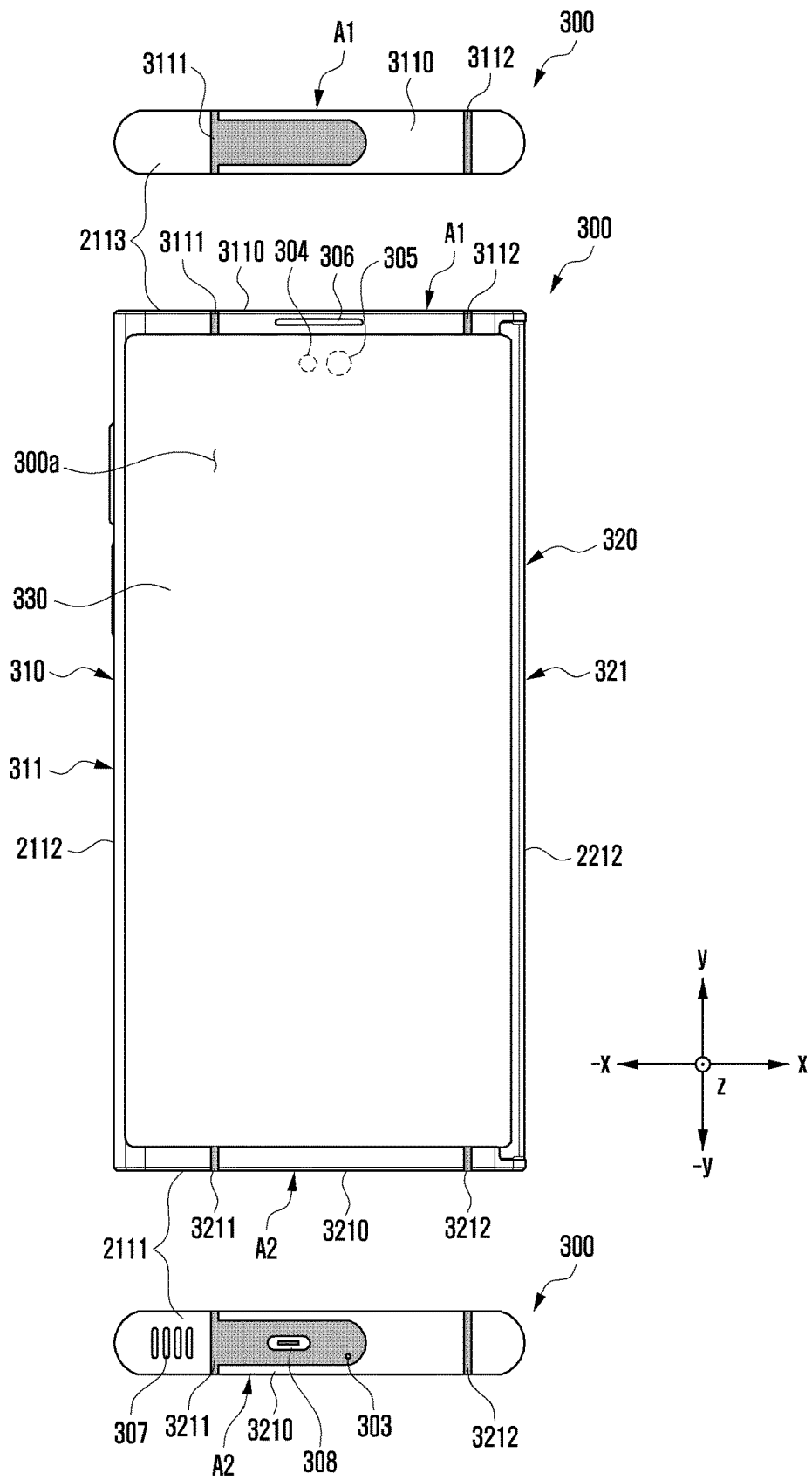
FIGS. 3A and 3B are diagrams illustrating a front surface and a rear surface when an electronic device extendable in a transverse direction is in a slide-in state according to various embodiments.
Figure 3B:
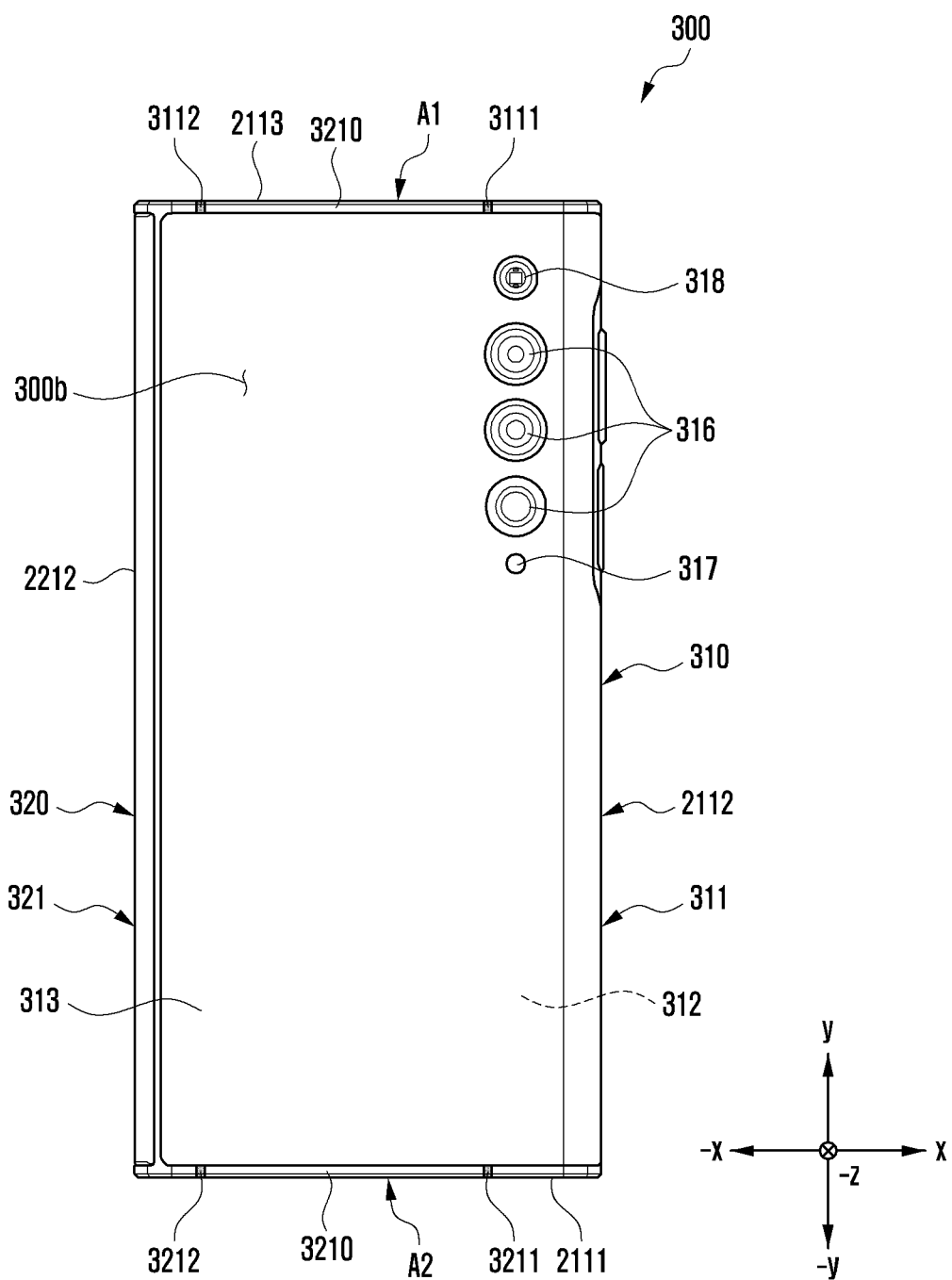
Figure 4A:
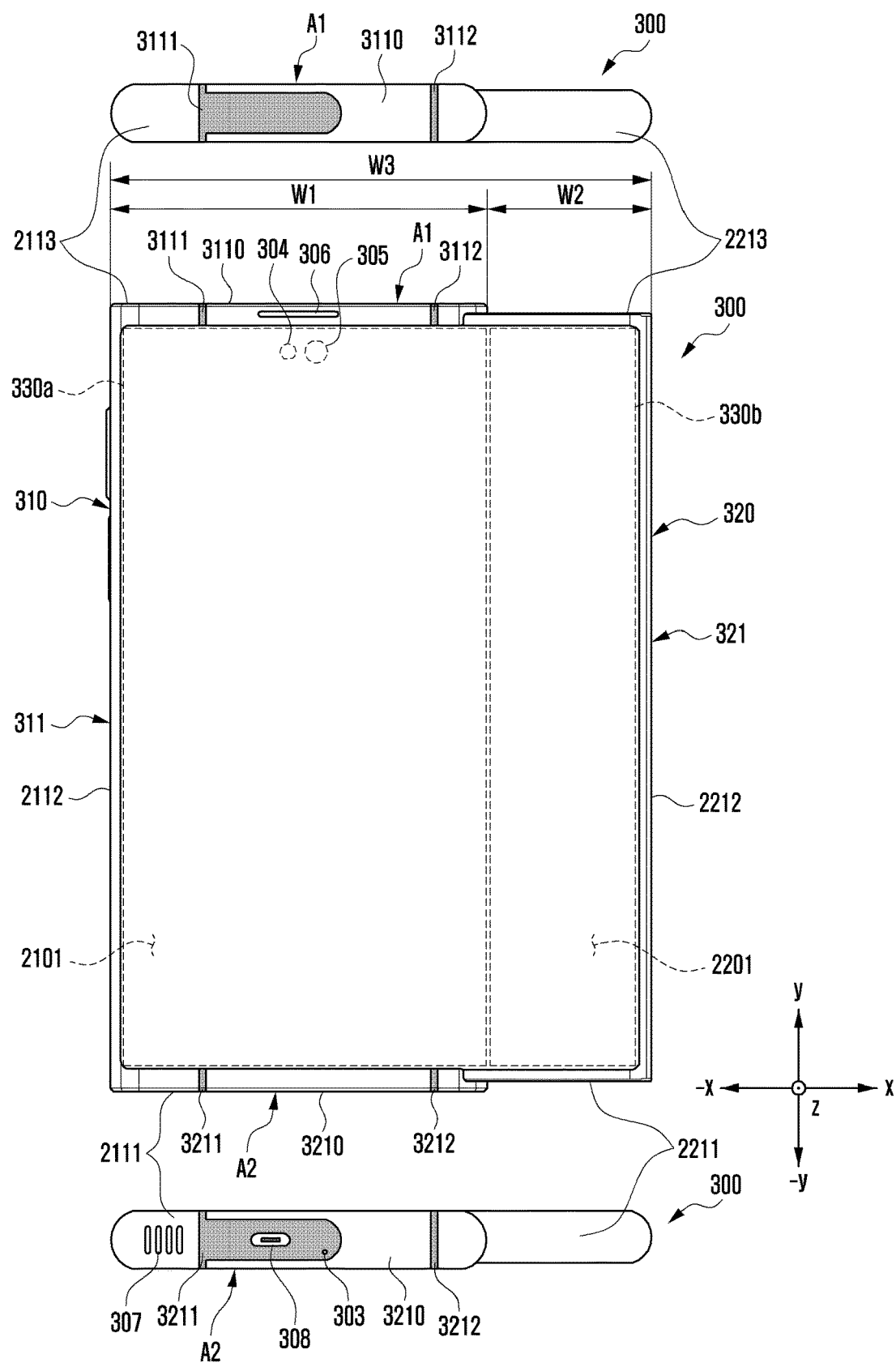
FIGS. 4A and 4B are diagrams illustrating a front surface and a rear surface when an electronic device extendable in a transverse direction is in a slide-out state according to various embodiments.
Figure 4B:
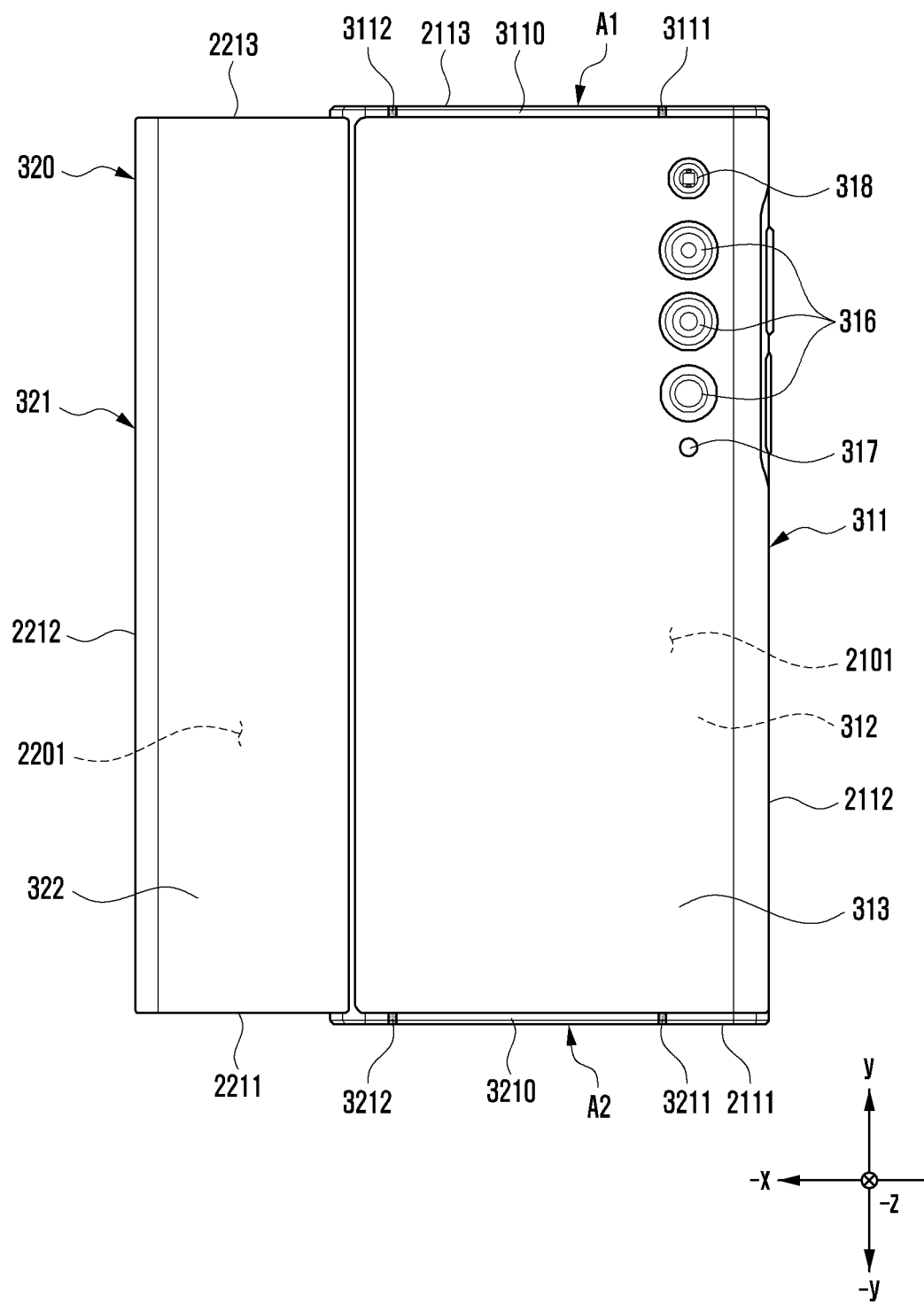

FIGS. 3A and 3B are diagrams illustrating a front surface and a rear surface when an electronic device extendable in a transverse direction is in a slide-in state according to various embodiments, and FIGS. 4A and 4B are diagrams illustrating a front surface and a rear surface when the electronic device is in a slide-out state.

Referring to FIGS. 3A to 4B, the electronic device 300 may include a first housing 310 (e.g., a first housing structure, a fixed part, or a base housing), a second housing 320 (e.g., a second housing structure, a moving part, or a slide housing) coupled to be movable relative to the first housing 310 in a specified direction (e.g., the x-axis direction) and within a specified distance, and a flexible display 330 disposed to be supported by at least a portion of the first housing 310 and the second housing 320. The flexible display 330 may include an expandable display or a stretchable display. The flexible display 330 may include at least some of the configurations and/or functions of the display module 160 illustrated in FIG. 1.

According to an embodiment, at least a portion of the second housing 320 may be received inside a first space 2101 of the first housing 310, so that the electronic device 300 may switch to a slide-in state. The electronic device 300 may include a bendable member (or bendable support member) (e.g., the bendable member 340 in FIG. 5) (e.g., an articulated hinge module or a multi-bar assembly) that at least partially forms the same plane as at least a portion of the first housing 310 in a slide-out state and is at least partially received in a second space 2201 of the second housing 320 in a slide-in state.

According to an embodiment, at least a portion of the flexible display 330 may be received in the inner space 2201 of the second housing 320 while being supported by the bendable member (e.g., the bendable member 340 in FIG. 5) in the slide-in state (e.g., a first state) to be disposed so as not to be visible from the outside. At least a portion of the flexible display 330 may be disposed to be visible from the outside while being supported by the bendable member (e.g., the bendable member 340 in FIG. 5) at least partially forming the same plane as the first housing 310 in the slide-out state (e.g., a second state).

According to various embodiments, the electronic device 300 may include a front surface 300a (e.g., a first surface), a rear surface 300b (e.g., a second surface) facing in the opposite direction of the front surface 300a, and a side surface (not shown) surrounding the space between the front surface 300a and the rear surface 300b. For example, in the electronic device 300, the first housing 310 may include a first side member 311, and the second housing 320 may include a second side member 321.

According to an embodiment, the first side member 311 may include a first side surface 2111 extending in a first direction (e.g., the x-axis direction) to have a first length, a second side surface 2112 extending from the first side surface 2111 in a direction (e.g., the y-axis direction) substantially perpendicular thereto to have a second length greater than the first length, and a third side surface 2113 extending substantially parallel to the first side surface 2111 from the second side surface 2112 to have the first length. The first side member 311 may be at least partially formed of a conductive material (e.g., metal). At least a portion of the first side member 311 may include a first support member 312 extending to at least a portion of the first space 2101 of the first housing 310.

According to an embodiment, the second side member 321 may include a fourth side surface 2211 that at least partially corresponds to the first side surface 2111 and has a third length, a fifth side surface 2212 extending from the fourth side surface 2211 in a direction substantially parallel to the second side surface 2112 and having a fourth length greater than the third length, and a sixth side surface 2213 extending from the fifth side surface 2212 to correspond to the third side surface 2113 and having the third length. The second side member 321 may be at least partially formed of a conductive material (e.g., metal). At least a portion of the second side member 321 may include a second support member 322 extending to at least a portion of the second space 2201 of the second housing 320.

According to an embodiment, the first side surface 2111 and the fourth side surface 2211, and the third side surface 2113 and the sixth side surface 2213 may be slidably coupled to each other. In the slide-in state of the electronic device 300, the fourth side surface 2211 may be disposed to overlap the first side surface 2111 so as to be substantially invisible from the outside. In the slide-in state of the electronic device 300, the sixth side surface 2213 may be disposed to overlap the third side surface 2113 so as to be substantially invisible from the outside. In some embodiments, in the slide-in state of the electronic device 300, at least portions of the fourth side surface 2211 and the sixth side surface 2213 may be disposed so as to be at least partially visible from the outside.

According to an embodiment, in the slide-in state of the electronic device 300, the second support member 322 may be disposed to overlap the first support member 312 so as to be substantially invisible from the outside. In some embodiments, a portion of the second support member 322, in the slide-in state, may be disposed to overlap the first support member 312 so as not to be visible from the outside, and the remaining portions of the second support member 322 may be disposed so as to be visible from the outside.

According to an embodiment, the electronic device 300 may include a rear cover 313 disposed on at least a portion of the first housing 310. The rear cover 313 may be disposed on the rear surface 300b of the electronic device 300 through at least a portion of the first support member 312. In some embodiments, the rear cover 313 may be integrally formed with the first side member 311. The rear cover 313 may be formed by polymer, coated or tinted glass, ceramic, metal (e.g., aluminum, stainless steel (STS), or magnesium), or a combination of at least two of the above materials. In some embodiments, the rear cover 313 may also extend to at least a portion of the first side member 311. At least a portion of the first support member 312 may be replaced with the rear cover 313. The electronic device 300 may include another rear cover (e.g., a second rear cover) that may be disposed in at least a portion of the second support member 322 or replaced with at least a portion of the second support member 322 in the second housing 320.

According to an embodiment, the electronic device 300 may include a flexible display 330 (e.g., an expandable display) supported by at least a portion of the first housing 310 and the second housing 320. The flexible display 330 may include a first part 330a (e.g., a first display) that is always visible from the outside in the slide-in state or slide-out state, and a second part 330*b* (e.g., a second display) that extends from the first part 330*a* and expands in a specified direction (e.g., the x-axis direction) together with the second housing 320 in the slide-out state. The first part 330*a* of the flexible display 330 may form a first display area, and the second part 330*b* thereof may form a second display area. The first part 330*a* of the flexible display 330 may form a flat surface, and the second part 330*b* may form a bendable portion that is at least partially received in the second space 2201 of the second housing 320 such that at least a portion thereof is not visible from the outside in the slide-in state. The first part 330*a* may be disposed to be supported by the first housing 310, and the second part 330*b* may be disposed to be at least partially supported by the bendable member (e.g., the bendable member 340 in FIG. 5). As the second housing 320 slides out in a specified direction (e.g., the x-axis direction), the second part 330*b* of the flexible display 330 may extend from the first part 330*a* while being supported by the bendable member (e.g., the bendable member 340 in FIG. 5) so as to be disposed to be visible from the outside while forming a plane substantially the same as the first part 330*a*. As the second housing 320 slides into the first housing 310 in a specified direction (e.g., the −x-axis direction), the second part 330*b* of the flexible display 330 may be received in the second space 3201 of the second housing 320 and disposed so as not to be visible from the outside. As the second housing 320 slides (e.g., is drawn) out of the first housing 310 in a specified direction (e.g., the x-axis direction), the display area of the flexible display 330 may be extended in the electronic device 300.

In an embodiment, the electronic device 300 may display at least one application using the first part 330*a* (e.g., the first display area) of the flexible display 330 in the slide-in state. In another embodiment, when the second housing 320 is in the slide-out state with respect to the first housing 310, the electronic device 300 may display at least one application using the first part 330*a* (e.g., the first display area) and the second part 330*b* (e.g., the second display area). In various embodiments, the flexible display 330 may display a first application (A) using the first part 330*a* and display a second application (B) using the second part 330*b* in the slide-out state.

In an embodiment, referring to FIG. 4A, although the first part 330*a* (e.g., the first display area) of the flexible display 330 is illustrated to be larger than the second part 330*b* (e.g., the second display area), the first part 330*a* and the second part 330*b* may be formed to have substantially the same size, or the second part 330*b* may be formed to be larger than the first part 330*a*. The first part 330*a* and the second part 330*b* of the flexible display 330 may be formed to have the same size or various different sizes from each other.

According to an embodiment, the first housing 310 and the second housing 320 may be operated to slide relative to each other such that the overall width thereof varies. Referring to FIG. 4A, the electronic device 300 may be configured to have a first width W1 from the second side surface 2112 to the fifth side surface 2212 in the slide-in state. The electronic device 300 may be configured to have a third width W3 greater than the first width W1 in the slide-out state by at least a portion of the bendable member (e.g., the bendable member 340 in FIG. 5) received in the second space 2201 of the second housing 310 moving to have an additional width W2. For example, the flexible display 330 may have a display area substantially corresponding to the first width W1 in the slide-in state and have an extended display area substantially corresponding to the third width W3 in the slide-out state. In an embodiment, although it is illustrated in FIG. 4A that the second width W2 has a smaller width than the first width W1, the first width W1 and the second width W2 may be configured to be substantially the same. In an embodiment, the first part 330*a* and the second part 330*b* of the flexible display 330 may be configured to have substantially the same display screen.

According to an embodiment, the electronic device 300 may include at least one of an input module (e.g., a microphone 303) disposed in the first space 2101 of the first housing 310, a sound output module (e.g., a receiver 306 for a call or a speaker 307), sensor modules 304 and 317, a camera module (e.g., a first camera module 305 or a second camera module 316), a connector port 308, a key input device (not shown), or an indicator (not shown). The electronic device 300 may be configured such that at least one of the above-described elements is omitted or such that other elements are further included. In another embodiment, at least one of the above-described elements may be disposed in the second space 2201 of the second housing 320.

According to various embodiments, the input module may include the embodiment related to the input module 150 in FIG. 1. The sound output module may include the embodiment related to the sound output module 155 in FIG. 1. The sensor modules 304 and 317 may include the embodiment related to the sensor module 176 in FIG. 1. The camera module may include the embodiment related to the camera module 180 in FIG. 1.

According to an embodiment, the input module (e.g., the input module 150 in FIG. 1) may include a microphone 303. In some embodiments, the input module (e.g., the microphone 303) may include a plurality of microphones arranged to detect the direction of sound. The sound output module may include, for example, a receiver 306 for a call and a speaker 307. The speaker 307 may face the outside through at least one speaker hole formed in the first housing 310 in the slide-out state. The connector port 308 may face the outside through a connector port hole formed in the first housing 310 in the slide-out state. The receiver 306 for a call may include a speaker (e.g., a piezo speaker) that is operated without a separate speaker hole.

According to various embodiments, the sensor modules 304 and 317 (e.g., the sensor module 176 in FIG. 1) may generate an electrical signal or data value corresponding to an internal operating state of the electronic device 300 or an external environmental state. The sensor modules 304 and 317 may include, for example, a first sensor module 304 (e.g., a proximity sensor or an illuminance sensor) disposed on the front surface 300*a* of the electronic device 300 and/or a second sensor module 317 (e.g., a heart rate monitoring (HRM) sensor) disposed on the rear surface 300*b*. The first sensor module 304 may be disposed on the rear surface (e.g., the −z-axis direction) of the flexible display 330 on the front surface 300*a* of the electronic device 300. The first sensor module 304 and/or the second sensor module 317 may include at least one of a proximity sensor, an illuminance sensor, a time-of-flight (TOF) sensor, an ultrasonic sensor, a fingerprint recognition sensor, a gesture sensor, a gyro sensor, an atmospheric pressure sensor, a magnetic sensor, an acceleration sensor, a grip sensor, a color sensor, an infrared (IR) sensor, a biometric sensor, a temperature sensor, or a humidity sensor.

According to an embodiment, the camera module (e.g., the camera module 180 in FIG. 1) may include a first camera module 305 disposed on the front surface 300*a* of the electronic device 300 and a second camera module 316 disposed on the rear surface 300*b* thereof. The electronic device 300 may include a flash 318 positioned near the second camera module 316. The camera modules 305 and 316 may include one or more lenses, an image sensor, and/or an image signal processor. The first camera module 305 may be configured to be disposed on the rear surface (e.g., the −z-axis direction) of the flexible display 330 and photograph a subject through a portion of the active area of the flexible display 330. The flash 318 may include, for example, a light-emitting diode or a xenon lamp.

According to an embodiment, the first camera module 305 among the camera modules and some sensor modules 304 among the sensor modules 304 and 317 may be disposed to detect an external environment through the flexible display 330. For example, the first camera module 305 or some sensor modules 304 may be disposed in the first space 2201 of the first housing 310 so as to be exposed to the external environment through a transmission area or a perforated opening formed in the flexible display 330. The area of the flexible display 330 facing the first camera module 305 may be a portion of an area displaying content and formed as a transmission area having a specified transmittance. According to an embodiment, the transmission area may be formed to have a transmittance ranging from about 5% to about 20%. The transmission area may include an area overlapping an effective area (e.g., an angle of view) of the first camera module 305 through which light for producing an image passes to reach an image sensor. For example, the transmission area of the flexible display 330 may include an area having a lower pixel density and/or wiring density than the surrounding areas. For example, some camera modules 305 may include an under-display camera (UDC). In some embodiments, some sensor modules 304 may be disposed to perform their functions in the inner space of the electronic device 300 without being visually exposed through the flexible display 330.

According to an embodiment, the electronic device 300 may include one or more antennas A1 and A2 that are electrically connected to a wireless communication circuit (e.g., the wireless communication module 192 in FIG. 1) disposed in the first space 2101 of the first housing 310. One or more antennas A1 and A2 may include a first antenna A1 disposed in an upper area of the electronic device 300 and a second antenna A2 disposed in a lower area of the electronic device 300. In some embodiments, the electronic device 300 may further include one or more antennas disposed on the second side surface 2112 of the first housing 310 and/or the fifth side surface 2212 of the second housing 320. The first antenna A1 may include a first conductive part 3110 segmented by one or more non-conductive parts 3111 and 3112 on the third side surface 2113 of the first side member 311. The first conductive part 3110 may be disposed to be segmented by a first non-conductive part 3111 and a second non-conductive part 3112 spaced a predetermined distance apart from each other, and may be electrically connected to the wireless communication circuit (e.g., the wireless communication module 192 in FIG. 1). The second antenna A2 may include a second conductive part 3210 segmented by one or more non-conductive parts 3211 and 3212 on the first side surface 2111 of the first side member 311. The second conductive part 3210 may be disposed to be segmented by a third non-conductive part 3211 and a fourth non-conductive part 3212 spaced a predetermined distance apart from each other, and may be electrically connected to the wireless communication circuit (e.g., the wireless communication module 192 in FIG. 1).

According to an embodiment, the wireless communication circuit (e.g., the wireless communication module 192 in FIG. 1) may be configured to transmit and/or receive a wireless signal in a specified frequency band (e.g., about 800 MHz to about 6000 MHz) (e.g., a legacy band) through the first conductive part 3110 and/or the second conductive part 3120. In some embodiments, the electronic device 300 may further include at least one antenna module (e.g., a 5G antenna module or antenna structure) that is disposed in the inner space (e.g., the first space 2101 or the second space 2201) and transmits or receives a wireless signal in a frequency band of about 3 GHz to 100 GHz through another wireless communication circuit (e.g., the wireless communication module 192 in FIG. 1).

Figure 5:
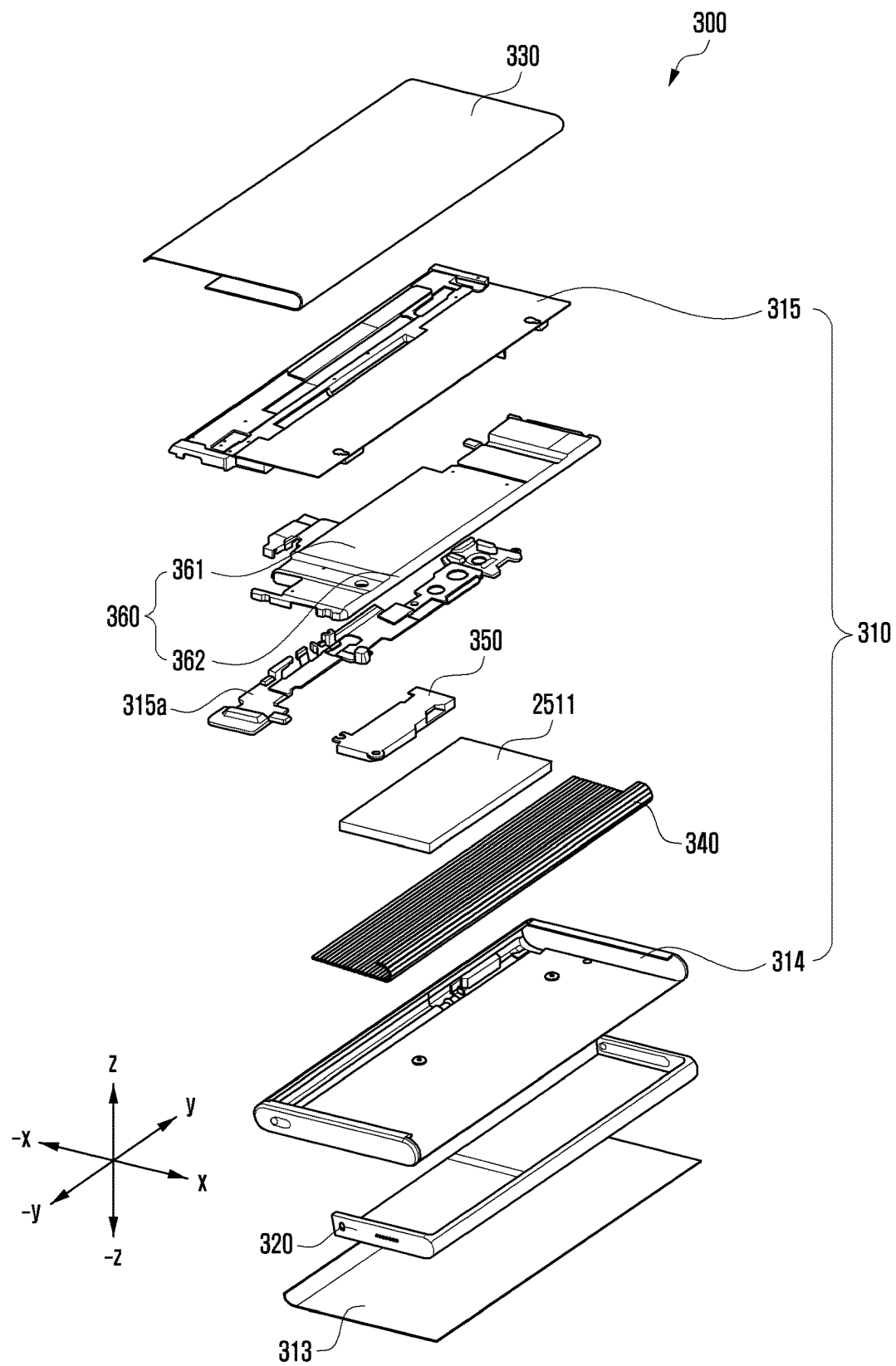
FIG. 5 illustrates an exploded perspective view of an electronic device extendable in a transverse direction according to various embodiments.

FIG. 5 illustrates an exploded perspective view of an electronic device according to various embodiments.

In the description of an electronic device 300 in FIG. 5, the same reference numerals will be assigned to the elements substantially the same as those of the electronic device 300 in FIGS. 3A to 4B, and detailed descriptions thereof may be omitted.

Referring to FIG. 5, the electronic device 300 may include a first housing 310, a second housing 320 slidably coupled to the first housing 310, a bendable member 340 (e.g., a multi-bar assembly) disposed to be at least partially rotatable in the second housing 320, and a flexible display 330 supported by at least a portion of the bendable member 340 and the first housing 310. According to an embodiment, the first housing 310 may be provided by coupling a cover housing 314 and a bracket housing 315 (e.g., a front housing). In some embodiments, at least a portion of the cover housing 314 may include a first support member (e.g., the first support member 312 in FIG. 4B) or may be replaced with the first support member 312.

According to an embodiment, the electronic device 300 may include a printed circuit board 350 disposed in a space between the cover housing 314 and the bracket housing 315 (e.g., the first space 2101 in FIG. 4A), and at least one battery 2511 disposed adjacent to the printed circuit board 350. The electronic device 300 may further include an additional bracket 315a that is disposed in the space (e.g., the first space 2101 in FIG. 4A) between the cover housing 314 and the bracket housing 315, and supports the printed circuit board 350 or at least one battery 2511.

According to an embodiment, the bendable member 340 may be disposed such that one end (e.g., a first end) thereof is fixed to the first housing 310 and such that the other end (e.g., a second end) thereof is received in the inner space (the second space 2201 in FIG. 4A) of the second housing 320 so as to be at least partially movable. For example, the bendable member 340 may be at least partially received in the inner space of the second housing 320 in the slide-in state. The bendable member 340 may be at least partially drawn out of the inner space of the second housing 320 so as to form substantially the same plane as the first housing 310 (e.g., the bracket housing 315) in the slide-out state. In an embodiment, the flexible display 330 supported by the first housing 310 and at least a portion of the bendable member 340 may change in the display area thereof visible from the outside according to a sliding operation.

According to an embodiment, the electronic device 300 may include a sliding frame 360 coupled to the second housing 320. The sliding frame 360 may be slidably coupled to the first housing 310 (e.g., the bracket housing 315). The sliding frame 360 may include a plate part 361 that is slidably coupled to the first housing 310 (e.g., the bracket housing 315) and a sliding bar 362 extending from the plate part 361 and pressing the rear surface of the bendable member 340. In some embodiments, the plate part 361 and the sliding bar 362 may be separately provided and structurally coupled. The sliding frame 360 may be included in the second housing 320. For example, the sliding frame 360 may be integrally formed with the second housing 320. In another embodiment, in the case where the sliding frame 360 is formed as a portion of the second housing 320, the sliding frame 360 may be omitted.

Hereinafter, a structure of an electronic device including a display that is extendable in a longitudinal direction, that is, extendable up or down, based on the longitudinal direction (or a portrait type) of the electronic device will be described with reference to FIGS. 6A, 6B, 7A, 7B, and 8.

Figure 6A:
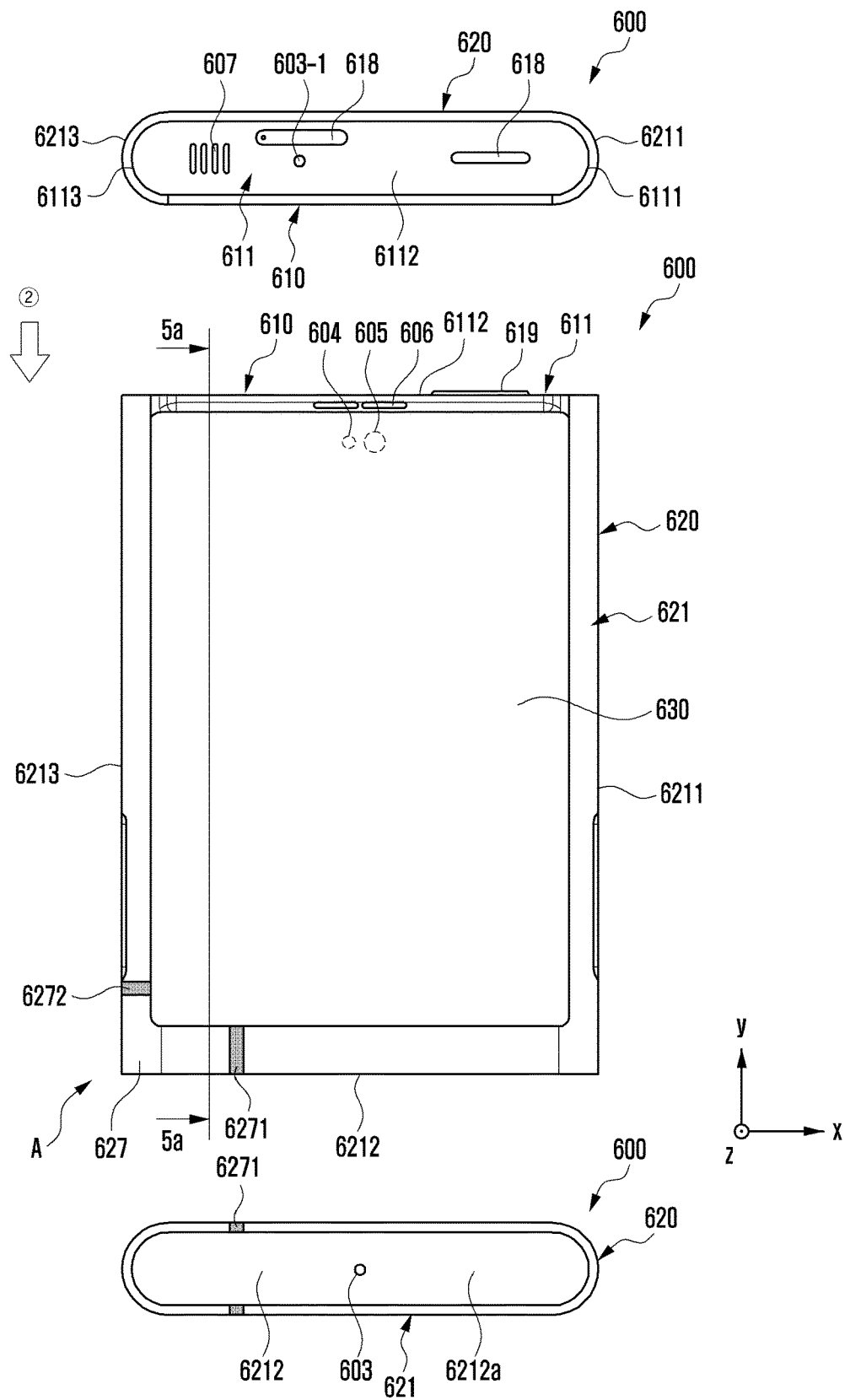
FIGS. 6A and 6B are diagrams illustrating a front surface and a rear surface when an electronic device extendable in a longitudinal direction is in a slide-in state according to various embodiments.
Figure 6B:
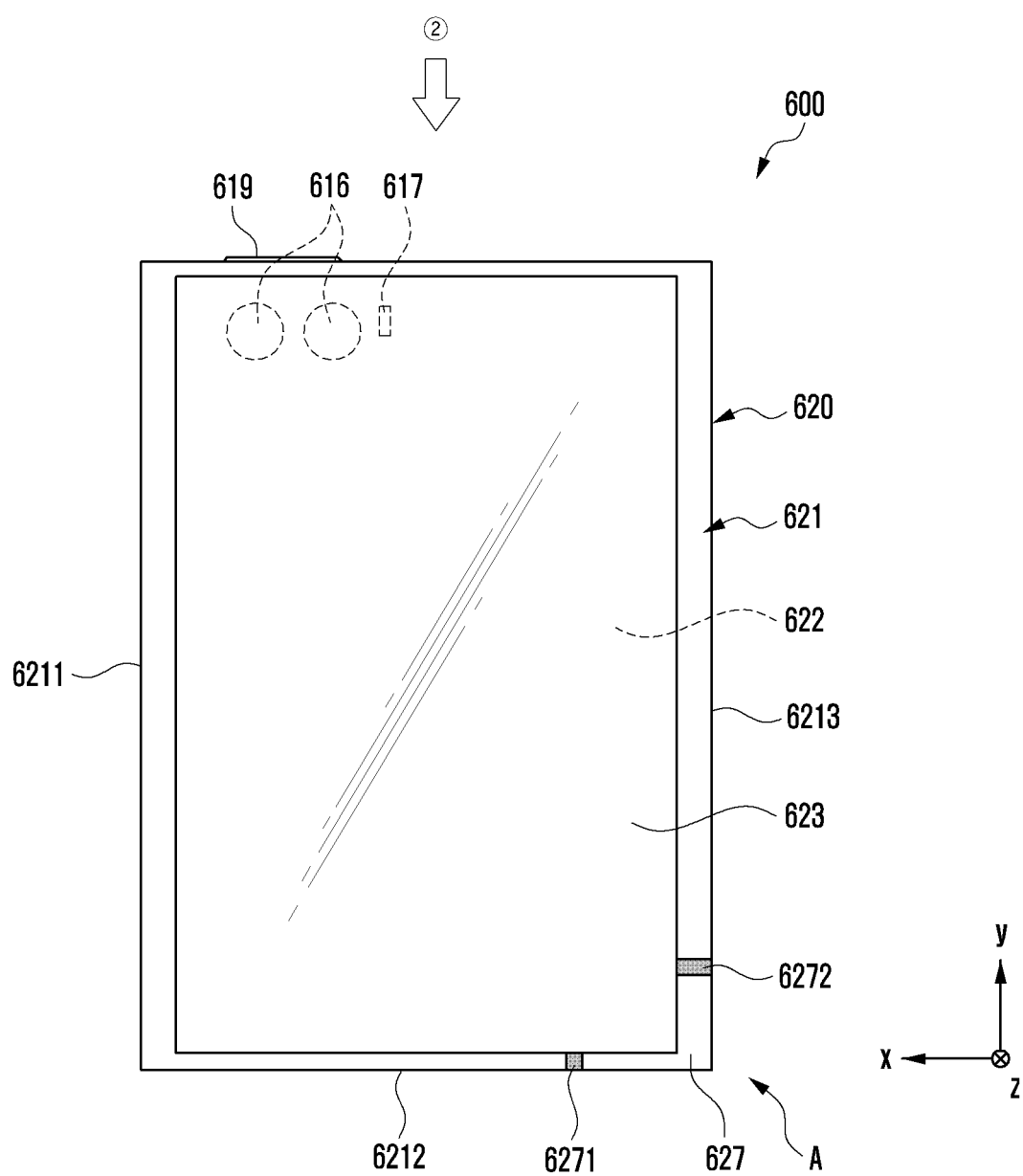
Figure 7A:
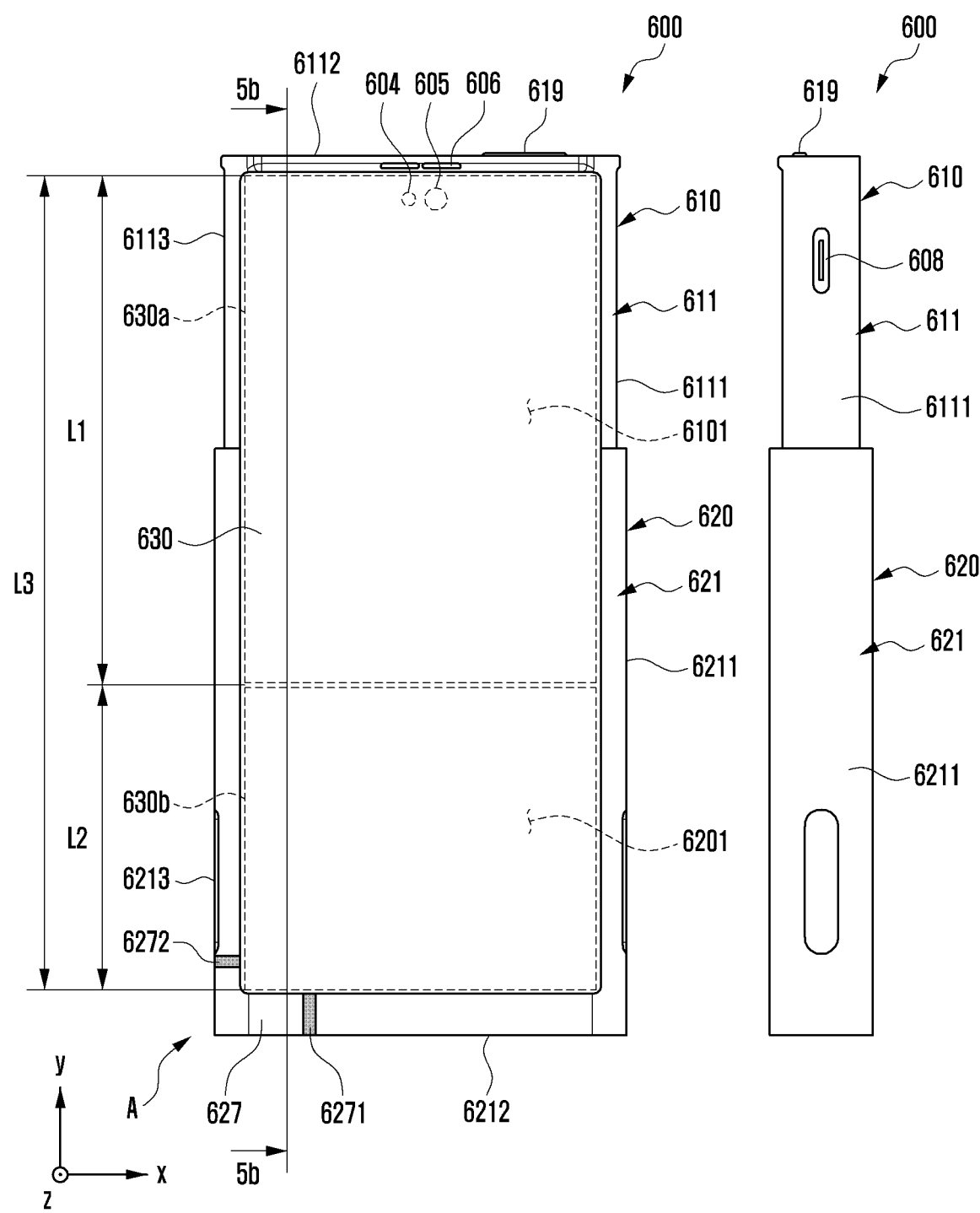
FIGS. 7A and 7B are diagrams illustrating a front surface and a rear surface when an electronic device extendable in a longitudinal direction is in a slide-out state according to various embodiments.
Figure 7B:
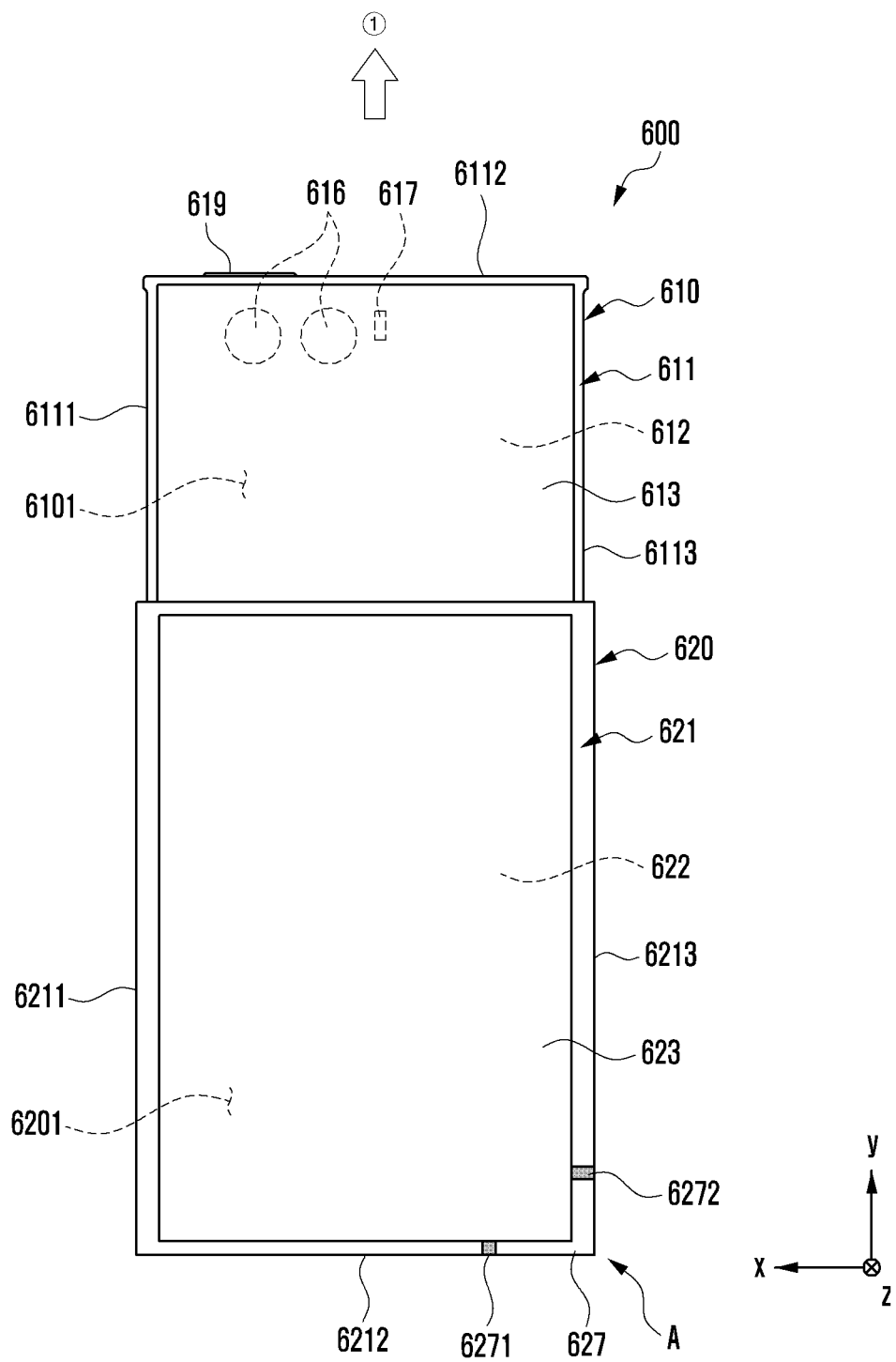

FIGS. 6A and 6B are diagrams illustrating a front surface and a rear surface when an electronic device extendable in a longitudinal direction is in a slide-in state according to various embodiments. FIGS. 7A and 7B are diagrams illustrating a front surface and a rear surface when an electronic device extendable in a longitudinal direction is in a slide-out state according to various embodiments.

Referring to FIGS. 6A to 7B, an electronic device 600 may include a first housing 610 (e.g., a first housing structure, a moving part, or a slide housing), a second housing 620 (e.g., a second housing structure, a fixed part, or a base housing) coupled to the first housing 610 to be slidable in a specified direction (e.g., the direction ① or the direction ②) (e.g., the y-axis direction), and a flexible display 630 disposed to be supported by at least a portion of the first housing 610 and the second housing 620. The flexible display 630 may include an expandable display or a stretchable display. The flexible display 630 may include at least some of the configurations and/or functions of the display module 160 illustrated in FIG. 1.

According to an embodiment, the electronic device 600 may be configured such that the first housing 620 slides out of the second housing 620 held by the user in a first direction (direction ①) or slides into the second housing 620 in a second direction (direction ②) opposite to the first direction (direction ①). According to an embodiment, at least a portion of the first housing 610 including a first space 6101 may be received in a second space 6201 of the second housing 620, thereby switching to a slide-in state.

According to an embodiment, the electronic device 600 may include a bendable member (or bendable support member) (e.g., the bendable member 640 in FIG. 8) (e.g., an articulated hinge module or a multi-bar assembly) that at least partially forms the same plane as at least a portion of the first housing 610 in a slide-out state and is at least partially received in the second space 6201 of the second housing 620 in a slide-in state.

According to an embodiment, at least a portion of the flexible display 630 may be received in the inner space 6201 of the second housing 620 while being supported by the bendable member (e.g., the bendable member 640 in FIG. 8) in the slide-in state to be disposed so as not to be visible from the outside. According to an embodiment, at least a portion of the flexible display 630 may be disposed to be visible from the outside while being supported by the bendable member (e.g., the bendable member 640 in FIG. 8) at least partially forming the same plane as the first housing 610 in the slide-out state.

According to various embodiments, the electronic device 600 may include a first housing 610 including a first side member 611 and a second housing 620 including a second side member 621. According to an embodiment, the first side member 611 may include a first side surface 6111 extending in a first direction (e.g., the y-axis direction) to have a first length, a second side surface 6112 extending from the first side surface 6111 in a direction (e.g., the x-axis direction) substantially perpendicular thereto to have a second length shorter than the first length, and a third side surface 6113 extending substantially parallel to the first side surface 6111 from the second side surface 6112 to have the first length. According to an embodiment, the first side member 611 may be at least partially formed of a conductive material (e.g., metal). In some embodiments, the first side member 611 may be formed by a combination of a conductive material and a non-conductive material (e.g., polymer)

According to an embodiment, the first housing 610 may include a first support member 612 extending from at least a portion of the first side member 611 to at least a portion of the first space 6101. According to an embodiment, the first support member 612 may be integrally formed with the first side member 611. In some embodiments, the first support member 612 may be configured separately from the first side member 611 and structurally coupled to the first side member 611.

According to various embodiments, the second side member 621 may include a fourth side surface 6211 that at least partially corresponds to the first side surface 6111 and has a third length, a fifth side surface 6212 extending from the fourth side surface 6211 in a direction substantially parallel to the second side surface 6112 and having a fourth length shorter than the third length, and a sixth side surface 6213 extending from the fifth side surface 6212 to correspond to the third side surface 6113 and having the third length. According to an embodiment, the second side member 621 may be at least partially formed of a conductive material (e.g., metal). In some embodiments, the second side member 621 may be formed by a combination of a conductive material and a non-conductive material (e.g., polymer). According to an embodiment, at least a portion of the second side member 621 may include a second support member 622 extending to at least a portion of the second space 6201 of the second housing 620. According to an embodiment, the second support member 622 may be integrally formed with the second side member 621. In some embodiments, the second support member 622 may be configured separately from the second side member 621 and structurally coupled to the second side member 621.

According to various embodiments, the first side surface 6111 and the fourth side surface 6211 may be slidably coupled to each other. According to an embodiment, the third side surface 6113 and the sixth side surface 6213 may be slidably coupled to each other. According to an embodiment, in the slide-in state, the first side surface 6111 may be disposed to overlap the fourth side surface 6211 so as to be substantially invisible from the outside. According to an embodiment, in the slide-in state, the third side surface 6113 may be disposed to overlap the sixth side surface 6213 so as to be substantially invisible from the outside. In some embodiments, at least a portion of the first side surface 6111 and the third side surface 6113 may be disposed to be at least partially visible from the outside in the slide-in state. According to an embodiment, in the slide-in state, the first support member 612 may be disposed to overlap the second support member 622 so as to be substantially invisible from the outside. In some embodiments, in the slide-in state, a portion of the first support member 612 may be disposed to overlap the second support member 622 so as not to be visible from the outside, and the remaining portions of the first support member 612 may be disposed to be visible from the outside.

According to various embodiments, the electronic device 600 may include a first rear cover 613 coupled to the first housing 610 on the rear surface thereof. According to an embodiment, the first rear cover 613 may be disposed through at least a portion of the first support member 612. In some embodiments, the first rear cover 613 may be integrally formed with the first side member 611. According to an embodiment, the first rear cover 613 may be form of polymer, coated or tinted glass, ceramic, metal (e.g., aluminum, stainless steel (STS), or magnesium), or a combination of at least two of the above materials. In some embodiments, the first rear cover 613 may extend to at least a portion of the first side member 611. In some embodiments, at least a portion of the first support member 612 may be replaced with the first rear cover 613.

According to various embodiments, the electronic device 600 may include a second rear cover 623 coupled to the second housing 620 on the rear surface. According to an embodiment, the second rear cover 623 may be disposed through at least a portion of the second support member 622. In some embodiments, the second rear cover 623 may be integrally formed with the second side member 621. According to an embodiment, the second rear cover 623 may be formed of polymer, coated or tinted glass, ceramic, metal (e.g., aluminum, stainless steel (STS), or magnesium), or a combination of at least two of the above materials. In some embodiments, the second rear cover 623 may extend to at least a portion of the second side member 621. In some embodiments, at least a portion of the second support member 622 may be replaced with the second rear cover 623.

According to various embodiments, the electronic device 600 may include a flexible display 630 disposed to be supported by at least a portion of the first housing 610 and the second housing 620. According to an embodiment, the flexible display 630 may include a first part 630a (e.g., a flat part) that is always visible from the outside and a second part 630b (e.g., a bendable part) that extends from the first part 630a and is at least partially received in the second space 6201 of the second housing 620 such that at least a portion thereof is not visible from the outside in the slide-in state.

Figure 8:
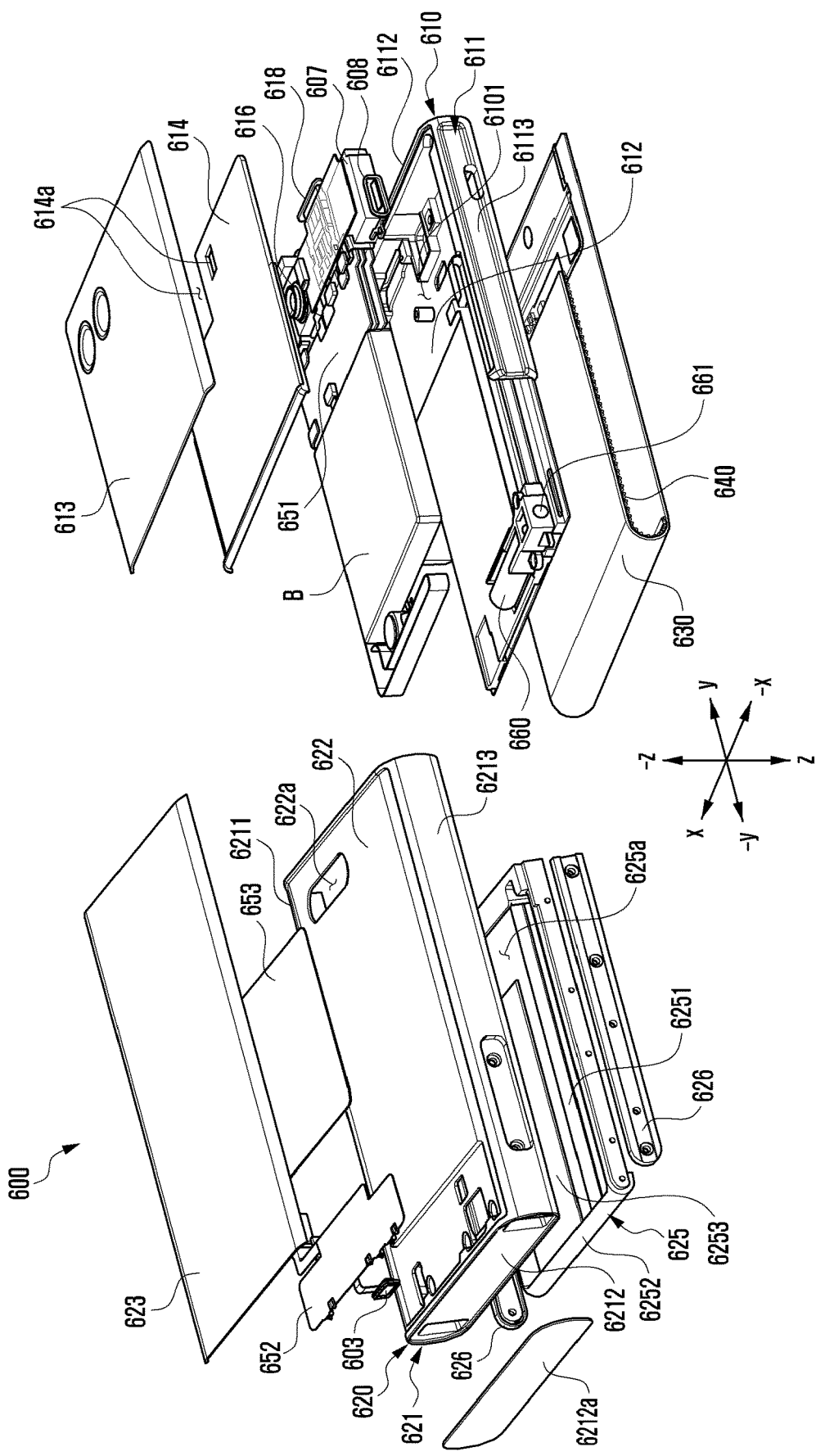
FIG. 8 illustrates an exploded perspective view of an electronic device extendable in a longitudinal direction according to various embodiments.

According to an embodiment, the first part 630a may be disposed to be supported by the first housing 610, and the second part 630b may be disposed to be at least partially supported by the bendable member (e.g., the bendable member 640 in FIG. 8).

According to an embodiment, in the state in which the first housing 610 slides out in the first direction (direction ①), the second part 630b of the flexible display 630 may extend from the first part 630a while being supported by the bendable member (e.g., the bendable member 640 in FIG. 8) so as to be disposed to be visible from the outside while forming a plane substantially the same as the first part 630a. According to an embodiment, in the state in which the first hosing 610 slides in the second direction (direction ②), the second part 630b of the flexible display 630 may be received the second space 6201 of the second housing 620 to be disposed so as not to be visible from the outside. Accordingly, the electronic device 600 may induce the display area of the flexible display 630 to vary as the first housing 610 slides from the second housing 620 in a specified direction (e.g., the y-axis direction).

According to various embodiments, the flexible display 630 may change in its length in the first direction (direction ①) according to the sliding movement of the first housing 610 relative to the second housing 620. For example, the flexible display 630 may have a first display area corresponding to a first length L1 (e.g., the area corresponding to the first part 630a) in the slide-in state. According to an embodiment, the flexible display 630, in the slide-out state, may be extended to have a third display area (e.g., the area including the first part 630a and the second part 630b), which corresponds to a third length L3 greater than the first length L1 and is greater than the first display area, as the first housing 610 further slides relative to the second housing 620 by a second length L2.

According to various embodiments, the electronic device 600 may include at least one of an input module (e.g., a microphone 603-1) disposed in the first space 6101 of the first housing 610, a sound output module (e.g., a receiver 606 for a call or a speaker 607), sensor modules 604 and 217, a camera module (e.g., a first camera module 605 or a second camera module 616), a connector port 608, a key input device 619, or an indicator (not shown). According to an embodiment, the electronic device 600 may include another input device (e.g., a microphone 603) disposed in the second housing. In another embodiment, the electronic device 600 may be configured such that at least one of the above-described elements is omitted or such that other elements are further included. In another embodiment, at least one of the above-described elements may be disposed in the second space 6201 of the second housing 620.

According to various embodiments, the input module may include a microphone 603-1. In some embodiments, the input module (e.g., the microphone 603-1) may include a plurality of microphones arranged to detect the direction of sound. The sound output module may include, for example, a receiver 606 for a call and a speaker 607. According to an embodiment, the speaker 607 may face the outside through at least one speaker hole formed in the first housing 610 at a position (e.g., the second side surface 6112) that is always exposed to the outside, regardless of the slide-in/slide-out state. In some embodiments, the connector port 608 may face the outside through an opening formed in the second housing to correspond to a connector port hole in the slide-in state. In some embodiments, the receiver 606 for a call may include a speaker (e.g., a piezo speaker) that is operated without a separate speaker hole.

According to various embodiments, the sensor modules 604 and 217 may generate an electrical signal or data value corresponding to an internal operating state of the electronic device 600 or an external environmental state. The sensor modules 604 and 217 may include, for example, a first sensor module 604 (e.g., a proximity sensor or an illuminance sensor) disposed on the front surface of the electronic device 600 and/or a second sensor module 617 (e.g., a heart rate monitoring (HRM) sensor) disposed on the rear surface of the electronic device 600. According to an embodiment, the first sensor module 604 may be disposed under the flexible display 630 on the front surface of the electronic device 600. According to an embodiment, the first sensor module 604 and/or the second sensor module 617 may include at least one of a proximity sensor, an illuminance sensor, a time-of-flight (TOF) sensor, an ultrasonic sensor, a fingerprint recognition sensor, a gesture sensor, a gyro sensor, an atmospheric pressure sensor, a magnetic sensor, an acceleration sensor, a grip sensor, a color sensor, an infrared (IR) sensor, a biometric sensor, a temperature sensor, or a humidity sensor.

According to various embodiments, the camera module may include a first camera module 605 disposed on the front surface of the electronic device 600 and a second camera module 616 disposed on the rear surface of the electronic device 600. According to an embodiment, the electronic device 600 may include a flash (not shown) positioned near the second camera module 616. According to an embodiment, the camera modules 605 and 216 may include one or more lenses, an image sensor, and/or an image signal processor. According to an embodiment, the first camera module 605 may be configured to be disposed under the flexible display 630 and photograph a subject through a portion of the active area (e.g., display area) of the flexible display 630.

According to various embodiments, the first camera module 605 among the camera modules and some sensor modules 604 among the sensor modules 604 and 217 may be disposed to detect an external environment through the flexible display 630. For example, the first camera module 605 or some sensor modules 604 may be disposed in the first space 6201 of the first housing 610 so as to be exposed to the external environment through a transmission area or a perforated opening formed in the flexible display 630. According to an embodiment, the area of the flexible display 630 facing the first camera module 605 may be a portion of an area displaying content and formed as a transmission area having a specified transmittance. According to an embodiment, the transmission area may be formed to have a transmittance ranging from about 5% to about 20%. The transmission area may include an area overlapping an effective area (e.g., an angle of view) of the first camera module 605 through which light for producing an image passes to reach an image sensor. For example, the transmission area of the flexible display 630 may include an area having a lower pixel density and/or wiring density than the surrounding areas. For example, the transmission area may replace the opening described above. For example, some camera modules 605 may include an under-display camera (UDC). In some embodiments, some sensor modules 604 may be disposed to perform their functions in the inner space of the electronic device 600 without being visually exposed through the flexible display 630.

According to various embodiments, the electronic device 600 may include at least one antenna (e.g., the antenna 614*b* in FIG. 10) electrically connected to a wireless communication circuit (e.g., the wireless communication module 192 in FIG. 1) disposed in the second housing 610. According to an embodiment, the electronic device 600 may include a bezel antenna A disposed through the second conductive side member 621 of the second housing 610. For example, the bezel antenna A may include a conductive part 627 that is disposed in at least a portion of the fifth side surface 6212 and the sixth side surface 6213 of the second side member 621 and electrically segmented by one or more segments 6271 and 2272 formed of a non-conductive material (e.g., polymer). According to an embodiment, the wireless communication circuit (e.g., the wireless communication module 192 in FIG. 1) may be configured to transmit and/or receive a wireless signal in at least one specified frequency band (e.g., about 800 MHz to about 6000 MHz) (e.g., a legacy band) through the conductive part 627. According to an embodiment, the electronic device 600 may include a side cover 6212*a* disposed on the fifth side surface 6212 to cover at least a portion of the at least one segment 6271. In some embodiments, the bezel antenna A may be disposed on at least one side surface of the second side surface 6112, the fourth side surface 6211, the fifth side surface 6212, and the sixth side surface 6213. In some embodiments, the electronic device 600 may further include at least one antenna module (e.g., a 5G antenna module or antenna structure) that is disposed in the inner space (e.g., the first space 6101 or the second space 6201) and transmits or receives a wireless signal in a frequency band of about 3 GHz to 100 GHz through another wireless communication circuit (e.g., the wireless communication module 192 in FIG. 1).

According to various embodiments, the slide-in/slide-out operation of the electronic device 600 may be automatically performed. For example, the slide-in/slide-out operation of the electronic device 600 may be performed by a gearing operation of a driving motor (e.g., the driving motor 660 in FIG. 8) including a pinion gear 661 disposed in the first space 6101 of the first housing 610 and a rack gear (e.g., the rack gear 6251 in FIG. 8) disposed in the second space 6201 of the second housing 620 to mesh with the pinion gear 661. For example, a processor (e.g., the processor 120 in FIG. 1) of the electronic device 600 may operate a driving motor (e.g., the driving motor 660 in FIG. 8) disposed inside the electronic device 600 when determining a triggering operation for switching from the slide-in state to the slide-out state or from the slide-out state to the slide-in state. According to an embodiment, the triggering operation may include selecting (e.g., touching) an object displayed on the flexible display 630 or manipulating a physical button (e.g., a key button) included in the electronic device 600. The triggering operation may be also initiated by a voice input or a specific gesture by a user.

FIG. 8 illustrates an exploded perspective view of an electronic device according to various embodiments of the disclosure.

In the description of an electronic device 600 in FIG. 8, the same reference numerals will be assigned to the elements substantially the same as those of the electronic device 600 in FIGS. 6A to 7B, and detailed descriptions thereof may be omitted.

Referring to FIG. 8, the electronic device 600 may include a first housing 610 including a first space 6101, a second housing 620 slidably coupled to the first housing 610 and including a second space (e.g., the second space 6201 in FIG. 7A), a bendable member 640 disposed to be at least partially rotatable in the second space 6201, a flexible display 630 supported by at least a portion of the bendable member 640 and the first housing 610, and a driving module for driving the first housing 610 in a direction (e.g., the −y-axis direction) of sliding into the second housing 620 and/or in a direction (e.g., the y-axis direction) of sliding out of the second housing 620.

According to an embodiment, the drive module may include a drive motor 660 disposed in the first space 6101 and including a pinion gear 661, and a rack gear 6251 disposed to mesh with the pinion gear 661 in the second space 6201. According to an embodiment, the driving module may further include a deceleration module disposed to be coupled to the driving motor 660, thereby reducing the rotational speed and increasing the driving force. According to an embodiment, the driving motor 660 may be disposed to be supported by at least a portion of the first support member 612 in the first space 6101 of the first housing 610. According to an embodiment, the driving motor 660 may be fixed to an end (e.g., an edge) of the first support member 612 in the slide-in direction (e.g., the −y-axis direction) in the first space 6101.

According to various embodiments, the electronic device 600 may include a plurality of electronic components disposed in the first space 6101. According to an embodiment, the plurality of electronic components may include a first substrate 651 (e.g., a main substrate), a camera module 616 disposed around the first substrate 651, and a socket module 618 (e.g., a SIM tray), a speaker 607, a connector port 608, and a battery B. According to an embodiment, since the plurality of electronic components is disposed around the first substrate 651 in the first space 6101 of the first housing 610 together with the driving motor 660, efficient electrical connection may be possible.

According to various embodiments, the electronic device 600 may include a rear bracket 614 disposed between the first support member 612 and the first rear cover 613 of the first housing 610 to cover at least some of the plurality of electronic components. According to an embodiment, the rear bracket 614 may be structurally coupled to at least a portion of the first support member 612. In some embodiments, the rear bracket 614 may be omitted. According to an embodiment, the rear bracket 614 may be disposed to cover a plurality of electronic components and to support the first rear cover 613. According to an embodiment, the rear bracket 614 may include a notch area 614a or an opening 614a (e.g., a through hole) formed in an area corresponding to the camera module 616 and/or the sensor module (e.g., the sensor module 617 in FIG. 7B). According to an embodiment, the camera module 616 and/or the sensor module 617 may be disposed to detect an external environment through the notch area 614a or the opening 614a. According to an embodiment, at least an area in the first rear cover 613 corresponding to the camera module 616 and/or the sensor module 617 may be processed to be transparent. In some embodiments, the camera module 616 and/or the sensor module 617 may be configured to operate only when the electronic device 600 is in the slide-out state.

According to various embodiments, the electronic device 600 may include a support bracket 625 (e.g., DSB or display support bar) in the form of a plate, which is disposed in the second space 6201 of the second housing 620 to be slidably coupled to at least a portion of the first support member 612. According to an embodiment, the support bracket 625 may include an opening 625a having a specified size. According to an embodiment, the support bracket 625 may include a support part 6252 that is disposed at one end thereof and has a curved outer surface to support the rear surface of the bendable member 640 that is bent during the sliding operation. According to an embodiment, the support bracket 625 may include a support plate 6253 formed to extend from at least a portion of the support part 6252 to at least a portion of the opening 625a, thereby supporting the rear surface of the bendable member 640 in the slide-out state. According to an embodiment, the support bracket 625 may include a rack gear 6251 that is fixed to cross the opening 625a and have a length in a direction parallel to the sliding direction. In some embodiments, the rack gear 6251 may be integrally formed with the support bracket 625. According to an embodiment, the electronic device 600 may include a pair of guide rails 626 disposed on both side surfaces of the support bracket 625 to guide both ends of the bendable member 640 in a sliding direction thereof.

According to various embodiments, the second housing 620 may include an opening 622a (e.g., a through hole) formed in an area of the second support member 622 corresponding to the camera module 616 and/or the sensor module 617 disposed in the first housing 610 when the electronic device 600 is in the slide-in state. According to an embodiment, when the electronic device 600 is in the slide-in state, the camera module 616 and/or the sensor module 617 may detect an external environment through the opening 622a formed in the second housing 620. In this case, at least the area corresponding to the camera module 616 and/or the sensor module 617 of the second rear cover 623 may be processed to be transparent.

According to various embodiments, the electronic device 600 may include a second substrate 652 and an antenna member 653 disposed in a space between the second support member 622 and the second rear cover 623 of the second housing 620. According to an embodiment, the second substrate 652 and the antenna member 653 may be connected to a first substrate 651 through at least one electrical connection member (e.g., a flexible printed circuit board (FPCB) or a flexible RF cable (FRC)). In some embodiments, the antenna member 653 may be electrically connected to the second substrate 652 so as to be electrically connected to the first substrate 651 through the second substrate 652.

Figure 9:
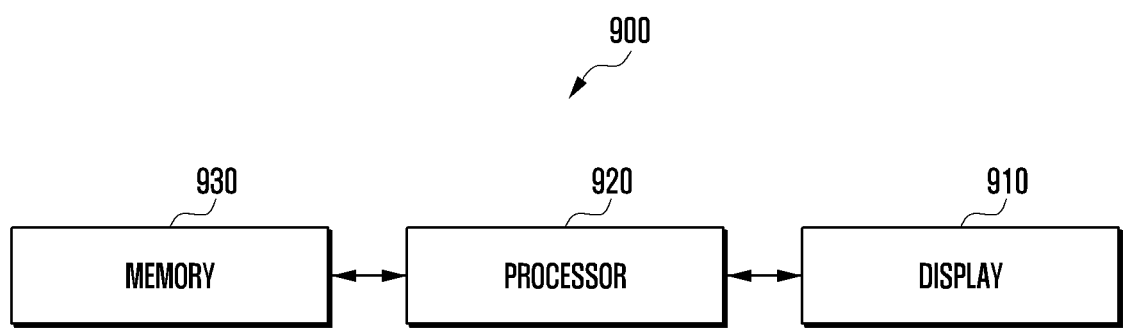
FIG. 9 illustrates a block diagram of an electronic device according to various embodiments.

FIG. 9 illustrates a block diagram of an electronic device according to various embodiments.

Referring to FIG. 9, the electronic device 900 may include a display 910, a processor 920, and a memory 930 and implement various embodiments of this document even if at least some of the illustrated configurations are omitted and/or substituted. The electronic device 900 may further include at least some of the configurations and/or functions of the electronic device 101 in FIG. 1.

Some (e.g., the processor 920 and the memory 930) of the configurations shown in FIG. 9 and/or other configurations of the electronic device 900 that are not shown in the drawing may be disposed inside a housing (not shown) of the electronic device 900, and some other configurations (e.g., the display 910 and a display switch trigger button (not shown)) may be at least partially exposed to the outside of the housing.

According to various embodiments, the display 910 is a configuration for outputting image data provided from the processor 920 and may be a rollable display in which at least a portion thereof is able to be rolled and/or a flexible display in which at least a portion thereof is able to be bent (or flexible).

According to various embodiments, the electronic device 900 may be a rollable or sliding type device in which the area of the display 910 exposed to the outside is extendable. For example, the electronic device 900 may include a first housing and a second housing, and the second housing may be coupled to the first housing so as to slide relative thereto. The display area of the display 910 may be reduced or increased based on a slide-in or slide-out operation of the second housing. The display 910 may be divided into a first part (e.g., the first part 330a in FIGS. 3A and 3B or the first part 630a in FIGS. 6A and 6B) and a second part (e.g., the second part 330b in FIGS. 3A and 3B or the second part 630b in FIGS. 6A and 6B), which are connected to each other, such that only the first part is exposed to the outside through the front surface of the electronic device 900 in the slide-in state and such that the first part and the second part are exposed to the outside in the slide-out state.

According to an embodiment, the electronic device 900 may be configured in a structure in which the electronic device 900 extends in a transverse direction (or horizontal direction), that is, a structure in which the electronic device 900 is extendable left or right based on the longitudinal direction (or portrait type) thereof. The structure of the electronic device 900 including a display extendable in the transverse direction has been described above with reference to FIGS. 3A, 3B, 4A, 4B, and 5. According to another embodiment, the electronic device 900 may be configured in a structure in which the electronic device 900 extends in a longitudinal direction (or vertical direction), that is, a structure in which the electronic device 900 is extendable up or down based on the longitudinal direction (or portrait type) thereof. The structure of the electronic device 900 including a display extendable in the longitudinal direction has been described above with reference to FIGS. 6A, 6B, 7A, 7B, and 8. Various embodiments described below with reference to FIGS. 9 to 15 may be applied to both the transversely extendable structure (e.g., FIGS. 3A to 5) and the longitudinally extendable structure (e.g., FIGS. 6A to 8) described above. Hereinafter, a slide-in state of the display 910 may be referred to as a first state and a slide-out state thereof may be referred to as a second state, or conversely, the slide-in state may be referred to as a second state and the slide-out state may be referred to as a first state.

According to various embodiments, the electronic device 900 may include a display switch trigger button capable of switching the state of the display 910 from the slide-in state to the slide-out state or from the slide-out state to the slide-in state. The display switch trigger button may be disposed on the outside of the housing, and at least a portion thereof may protrude so that the user may press the same by applying a physical force thereto. When the user presses the display switch trigger button, an electrical signal may be transmitted to the processor 920, and the processor 920 may detect the same as an event (hereinafter, a trigger event) that triggers switching of the state of the display 910.

According to various embodiments, the electronic device 900 may switch from the slide-in state to the slide-out state (or from the slide-out state to the slide-in state) by moving a part of the housing through a driving module (not shown) in a motor structure. According to another embodiment, the electronic device 900 may be configured to switch the display 910 to the slide-in or slide-out state by a physical force manually applied by a user without a separate driving module.

According to various embodiments, the display 910 may be configured as a touch screen that detects a touch and/or proximity touch (or hovering) input using a user's body part (e.g., a finger) or an input device (e.g., a stylus pen)

According to various embodiments, the memory 930 may include a volatile memory and a non-volatile memory to temporarily or permanently store a variety of data. The memory 930 may include at least some of the configurations and/or functions of the memory 130 in FIG. 1 and store the programs 140 in FIGS. 1 and 2. The memory 930 may store various instructions capable of being executed by the processor 920. Such instructions may include control commands such as arithmetic and logical operations, data transfer, input/output, and the like, which may be recognized by the processor 920.

According to various embodiments, the processor 920 is a configuration capable of performing an operation or data processing related to control and/or communication of respective elements of the electronic device 900, and may be comprised of one or more processors. The processor 920 may include at least some of the configurations and/or functions of the processor 120 in FIG. 1. The processor 920 may be operatively, functionally, and/or electrically connected to respective elements of the electronic device 900, such as the display 910, the memory 930, and the like.

According to various embodiments, the arithmetic and data processing functions of the processor 920, implemented in the electronic device 900, are not limited, and hereinafter, various embodiments for providing, when a trigger event (or input) is detected, a user interface that indicates a change in the state of a display and/or notifies of whether or not an application is to be re-executed and changing the state of the display 910 according to a user input will be described. Operations of the processor 920, which will be described below, may be performed by loading instructions stored in the memory 930.

According to various embodiments, the processor 920 may execute various types of applications. The applications described below are not limited, and may include applications such as the home 251, the dialer 253, the browser 259, and the like described with reference to FIG. 2 and a 3rd party application downloaded and installed by the user. The processor 920 may configure the layout of an application executed to conform to the current state (e.g., the slide-in state or the slide-out state) of the display 910 and output an application screen on the display 910.

According to various embodiments, the processor 920 may detect a trigger event for switching the display 910 to a second state while the display 910 is in a first state and while the application screen is being displayed on the display 910 in the first state. Hereinafter, for convenience of explanation, the first state will be referred to as a slide-in state and the second state will be referred to as a slide-out state, but various embodiments of this document may also be applied to the case where the first state is defined as a slide-out state and where the second state is defined as a slide-in state.

According to various embodiments, if a trigger event for switching the state of the display 910 is detected, for example, if a user presses a display switch trigger button, the processor 920, in response to the trigger event, may identify whether or not the running application is able to maintain the screen state of the application when switching the state of the display 910. For example, in the case where the application is re-executed when switching the state of the display 910, the screen state of the application may not be maintained. Various applications installed in the electronic device 900 may have different properties and operate differently from each other when switching the state of the display 910. For example, when switching the state of the display 910, some applications may change in the size between the area in which a previous screen is displayed and the area in which a screen according to the change is displayed, so that the screen state of the application may not be maintained and/or so that the application may be re-executed. Another application may maintain the screen state of the application and/or may not be re-executed even if the state of the display 910 is changed, thereby maintaining the current context as it is. An example of an application that is not re-executed and maintains the current context when switching the state of the display 910 will be described with reference to FIGS. 10A and 10B, and an example of an application that is re-executed when switching the state of the display 910 will be described with reference to FIGS. 11A, 11B, and 11C.

According to various embodiments, the processor 920 may identify whether or not the application is to be re-executed when switching the state of the display 910, based on attribute information of an activity constituting the current screen of the application. Here, the activity is a basic element configuring a user interface (UI) displayed on the screen, and if an application is executed, a specified activity may be executed and a new activity may be executed according to a user input to the UI. Here, the re-execution of the application may indicate an operation of resetting the running activity to conform to a change in the configuration of the device. If the application needs to be re-executed, the screen state of the application executed before switching the state of the display 910 may not be maintained.

According to an embodiment, the application may include attribute information of each activity, and the attribute information may be stored in a specific file (e.g., an extensible markup language (XML) file). In the case of the Android™ platform as an example, the attribute information of the activity may be stored in AndroidManifest.xml. The manifest file may be defined at the root of a project source set and provide the operating system with essential information about the application. The manifest file may contain information such as a package name of the application, elements thereof, authority to access a system or other applications, and hardware and software functions required for the application. If an event for changing the configuration of the device, such as switching the state of the display 910, occurs during the runtime of the activity, the application may be configured to re-execute the corresponding activity, and if a specific event is stored in the configuration changes (e.g., android:configChanges) of the manifest file, the activity may not be re-executed even if a corresponding event occurs. For example, in the case where change of a screen layout, change of an available screen size, and change of a physical screen size are defined in the configuration changes of the manifest file, the activity may not be reset even when a corresponding event occurs, and configuration changes due to expansion or reduction of the display 910 may be directly processed in the current activity. Expansion or reduction of the display 910 may include changing a screen layout, changing an available screen size, and changing a physical screen size, and thus if all three attributes are not defined in the manifest file as follows, the application may be re-executed when switching the state of the display 910.

android:
configchanges="screenSize|screenLayout|smallestScreenSize"

According to an embodiment, the processor 920 may identify the configuration changes (e.g., android:configchanges) in the attribute information of activity to identify whether or not an application is to be re-executed when switching the state of the display 910 and, if the activity is configured not to be reset in the attribute information when changing the screen layout, changing the available screen size, and changing the physical screen size, identify that the application is not re-executed when switching the state of the display 910. On the other hand, if at least one of changing the layout, changing the available screen size, and changing the physical screen size is not defined in the configuration change of the attribute information, the processor 920 may identify that the corresponding application is to be re-executed when switching the state of the display 910 (or that the screen state of the application is unable to be maintained).

According to an embodiment, in the case of a specific platform, device, and/or application, information such as the configuration changes (configChanges) may be specified in the attributes of the application itself, and in this case, an operation according to a configuration change event may be identically specified in all activities while the application is running in the foreground. According to the embodiment, the processor 920 may identify whether or not the application is able to maintain the screen state (or whether or not the application is to be re-executed) when switching the state of the display 910, based on the attribute information of the application.

Although the above description has been made for attribute information defined in a specific platform (or operating system) by way of example, various embodiments of this document are not limited thereto and may be applied to platforms other than Android™.

According to an embodiment, the processor 920 may identify attribute information of a currently running application or activity to identify whether or not the screen state is able to be maintained (or whether or not it is re-executed) when switching the state of the display 910 (e.g., switching from the slide-in state to the slide-out state or switching from the slide-out state to the slide-in state) in real time. According to an embodiment, it is identified that the currently running application is to be re-executed when switching the state of the display 910, the processor 920 may display an icon indicating the switching of the state of the rollable display (or indicating the re-execution) on at least a portion of the display 910. The icon may be displayed on a status bar or a navigation bar at the top of the display 910, and may continue to be displayed until the screen switches to another application or activity or disappear after being displayed for a predetermined time (e.g., 3 seconds). As the icon is displayed as described above, the user may recognize the possibility of re-execution of the current screen before pressing the display switch trigger button.

According to an embodiment, if a trigger event (or input) for switching the state of the display 910 occurs (e.g., if the user presses a display switch trigger button), the processor 920 may identify the attribute information of the application to identify whether or not re-execution is to be performed when switching the state of the display 910.

According to various embodiments, if it is identified that re-execution is not to be performed (or that the screen state is maintained) when switching the state of the display 910 as a result of identifying the attribute information of the application (or activity), the processor 920, when a trigger event such as pressing the display switch trigger button by the user occurs, may switch the state of the display 910 immediately in response to the trigger event. For example, if the user presses the display switch trigger button when the display 910 is in the slide-in state, the display 910 may be extended to the slide-out state using the driving module, and the application may be displayed on the extended display 910. In this case, the application may be displayed on the extended display 910 while maintaining the previous context without being re-executed.

According to various embodiments, if it is identified that re-execution is to be performed when switching the state of the display 910 as a result of identifying the attribute information of the application (or activity), the processor 920 may display a graphic element indicating re-execution of the application on the display 910. In this case, the processor 920 may maintain the previous state of the display 910 in the first state, and the application may be displayed in the same configuration as a previous one. The graphic element may be referred to as a graphic user interface (UI), a graphic object, or a visual queue.

According to an embodiment, the graphic element may be displayed in the form of a pop-up in the foreground of the application. For example, the processor 920 may display a pop-up window including a graphic element as a foreground layer of the application while the application is being displayed on the display. According to another embodiment, the graphic element may be displayed in a specified area on the display 910. For example, the processor 920 may display a graphic element, which indicates re-execution of the application, in the form of an icon on the status bar displayed on the top of the application.

According to various embodiments, the graphic element may include text and/or image information including information stating that the application may be re-executed when switching the display state, buttons (e.g., a YES button and a NO button) for selecting whether or not to switch the state of the display 910, and/or information about the remaining time until switching (or maintaining) of the state of the display 910. According to an embodiment, the graphic element may further include information related to switching (e.g., expanding or reducing) the state of the display 910. A specific example of the graphic element will be described in more detail with reference to FIGS. 13 to 15.

According to various embodiments, if a user input to the graphic element is received while the graphic element is being displayed, the processor 920 may switch the display 910 in the first state (e.g., the slide-in state) to the second state (e.g., the slide-out state). For example, if the user touches the graphic element displayed in the form of a pop-up or selects an element (e.g., a YES button) for accepting the switching of the state of the display 910 from the graphic element, the processor 920 may switch the display 910 to the second state. In this case, the display of the graphic element may be removed before switching the state of the display 910, and the re-executed application may be displayed on the display 910 in the second state.

According to various embodiments, if an input to the display switch trigger button is re-received while the graphic element is being displayed, the processor 920 may switch the display 910 in the first state to the second state.

According to an embodiment, the graphic element may include information indicating re-execution of an application, such as a toast pop-up, and may disappear after a predetermined time elapses. If a specified time elapses without an additional input from the user after displaying the graphic element, the following two embodiments may be configured. According to an embodiment, if a specified time elapses after displaying a graphic element in the first state, the processor 920 may switch the display 910 to the second state as if the user accepts the switching of the display state. According to another embodiment, if a specified time elapses after displaying a graphic element in the first state, the processor 920 may maintain the display 910 in the first state and continue to display the application as if the user denies the switching of the display state.

According to various embodiments, the electronic device 900 may enable the user to select and change, through a configuration menu, the configuration related to the graphic element such as the display position, method, display time, included information, and icon shape of the graphic element, whether or not to accept switching of the display state when a specified time elapses, and the like.

The configuration of the above-described user interface will be described in more detail with reference to FIGS. 13 to 15.

According to various embodiments, the electronic device (e.g., the processor 920 in FIG. 9) may execute various applications. For example, the electronic device may install and execute applications such as the home 251, the dialer 253, the browser 259, and the like described with reference to FIG. 2 and a 3rd party application downloaded and installed by the user. Various applications installed in the electronic device may have different properties and operate differently from each other when switching the state of the display. For example, when the state of the display is changed, some applications may change in the size between the area in which a previous screen is displayed and the area in which a screen according to the change is displayed, so that the screen state of the application may not be maintained and may be re-executed. Another application may not be re-executed and may maintain the current context as it is even if the state of the display is changed. In addition, when the same application is executed, a specific activity may be re-executed (or the screen state is unable to be maintained) when switching the display state, and other activities may not be re-executed (or the screen state may be maintained).

Figure 10A:
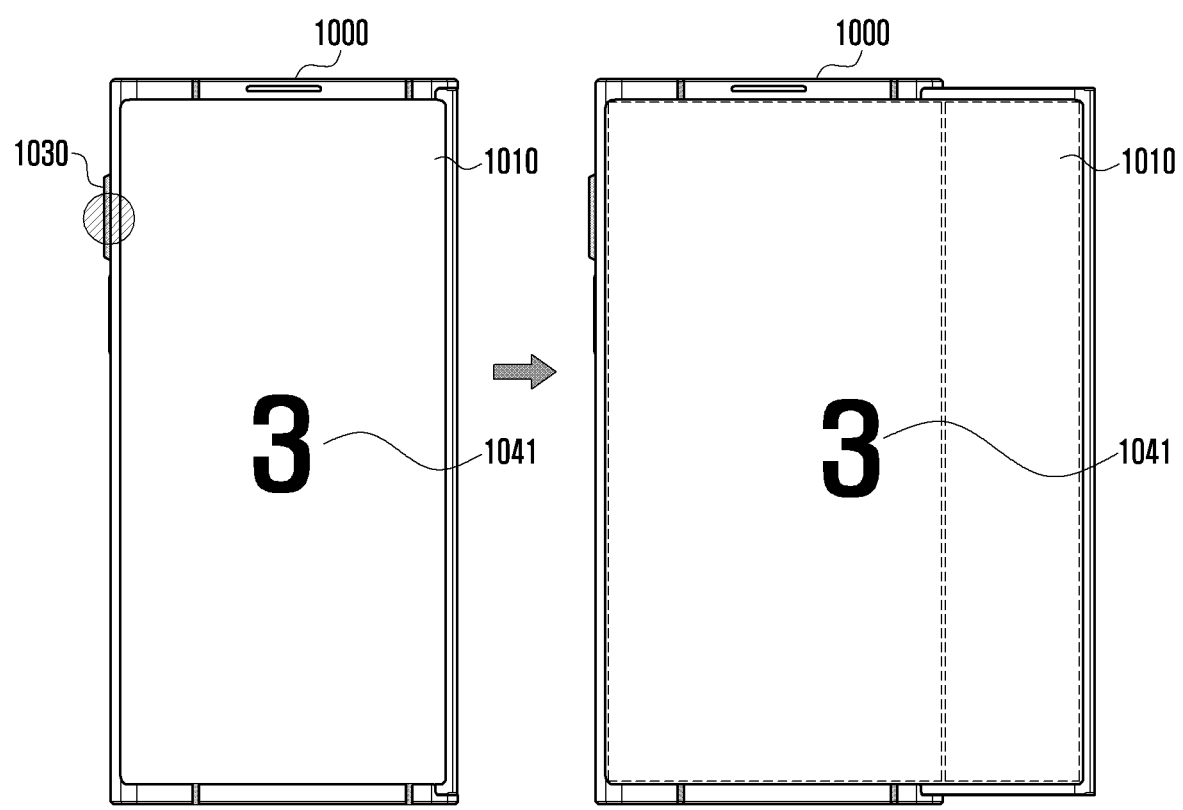
FIGS. 10A and 10B illustrate an example of an application of which the context is maintained when a display is changed.
Figure 10B:
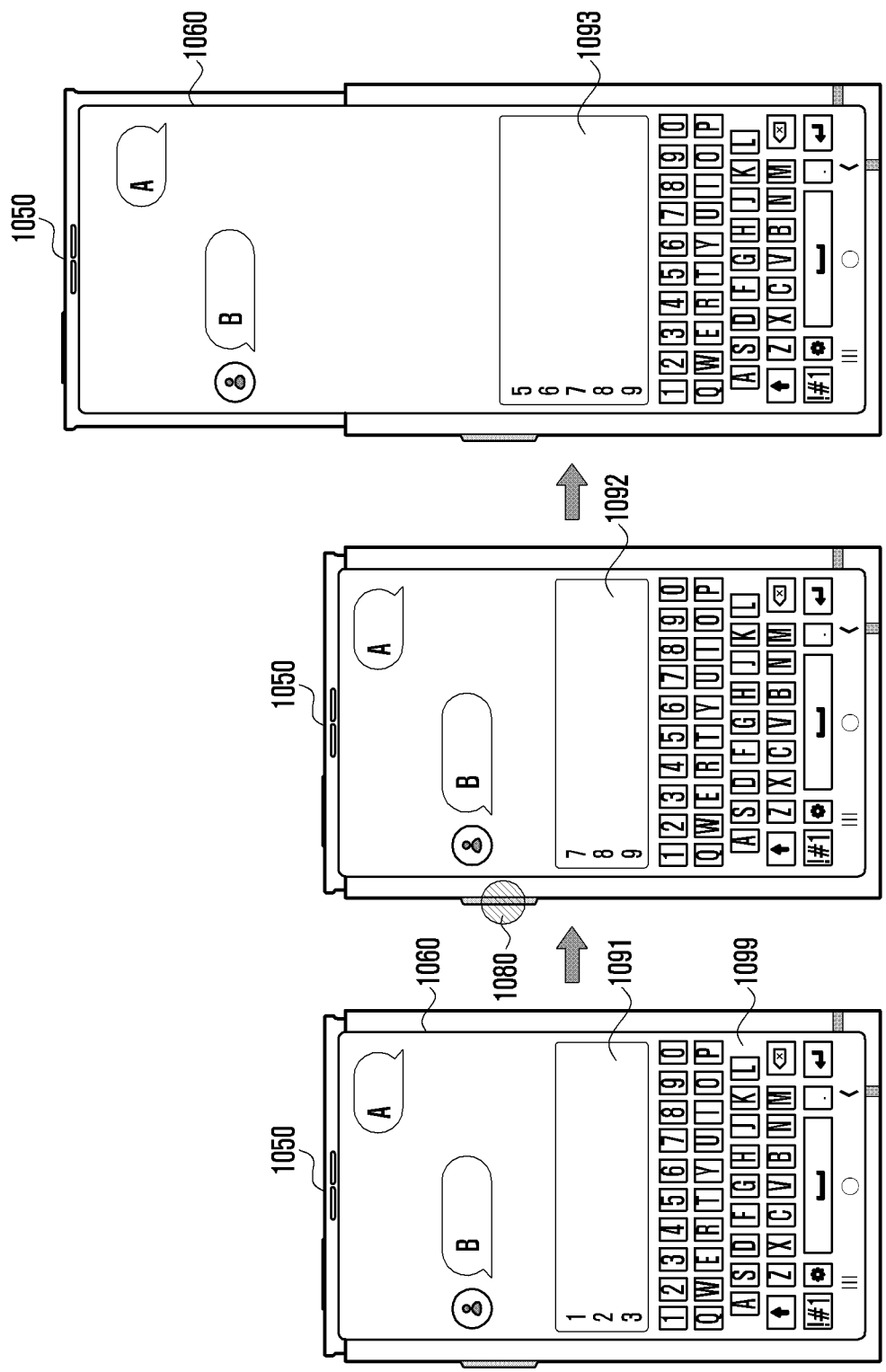

FIGS. 10A and 10B illustrate an example of an application of which the context is maintained when a display is changed.

Referring to FIG. 10A, a user of an electronic device 1000 is executing an application when a display 1010 is in the first state (e.g., the slide-in state), and a third page 1041 among several pages is currently executed and displayed. At this time, if the user presses a display switch trigger button 1030, the display 1010 may switch to the second state (e.g., may extend to the slide-out state), and since the application corresponds to an application that is not re-executed to maintain the context thereof even when switching the display state, the third page 1041 previously viewed may be displayed on the display 1010 in the second state without being re-executed.

Referring to FIG. 10B, the user is executing a message application when a display 1060 of an electronic device 1050 is in the slide-in state. As shown, the message application may display a text input window 1091 and a keyboard 1099, as well as the conversations, and the user is typing in text line by line 1, 2, 3, . . . 9, and the text input window 1091 may display only three lines thereof. If the user presses a display switch trigger button 1080 in the state 1092 in which typing of the lines 7, 8, and 9 are completed, the display 1060 may be extended to the slide-out state. In this case, since the message application is an application that is not re-executed when switching the display state, the context currently being input by the user may be maintained as it is. Referring to FIG. 10B, the size of a text input window 1093 may be increased according to the expansion of the display 1060, so that the text of five lines 5, 6, 7, 8, and 9, which conform to the size of the text input window, among the text input lastly by the user may be displayed on the text input window.

Extension or reduction of the display by the user may be regarded that the user wishes to change only the screen size while maintaining the content of the current screen. As shown in FIGS. 10A and 10B, if the attributes of a corresponding application (or activity) indicates that re-execution is not performed when switching the display state, the display may be extended or reduced immediately when a display switch trigger event occurs.

Figure 11A:
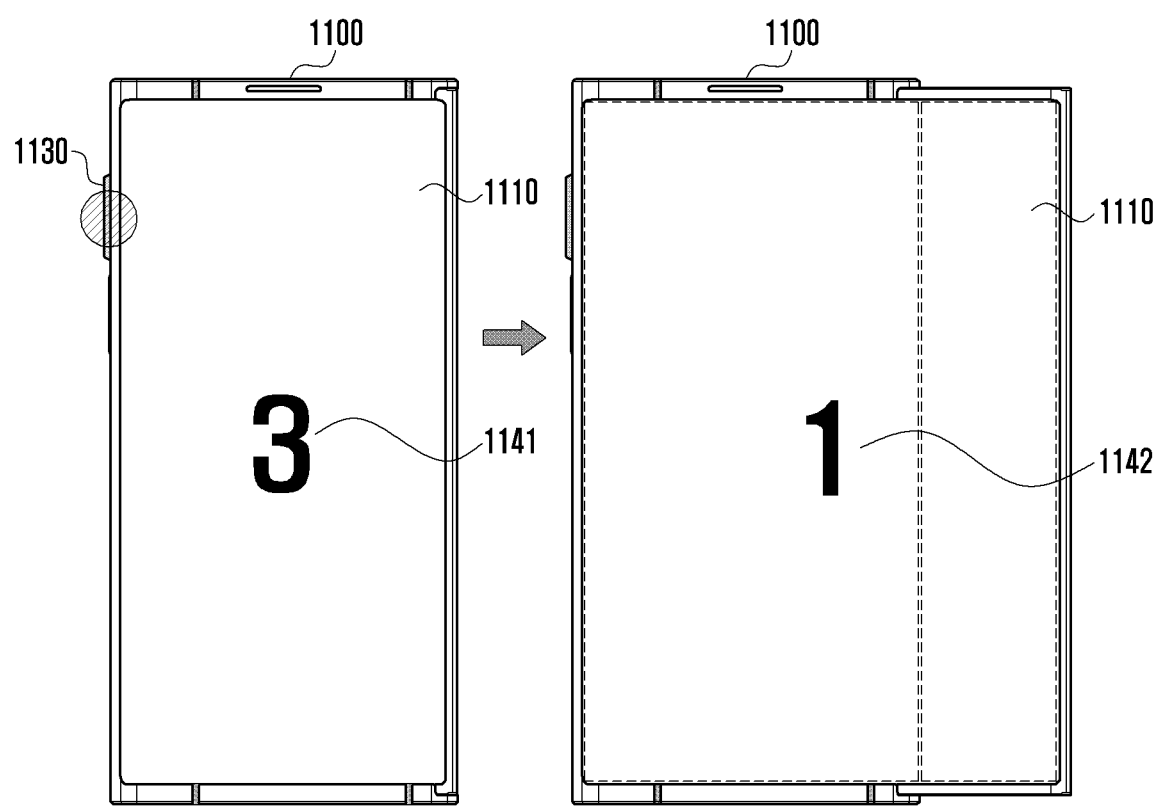
Figure 11B:
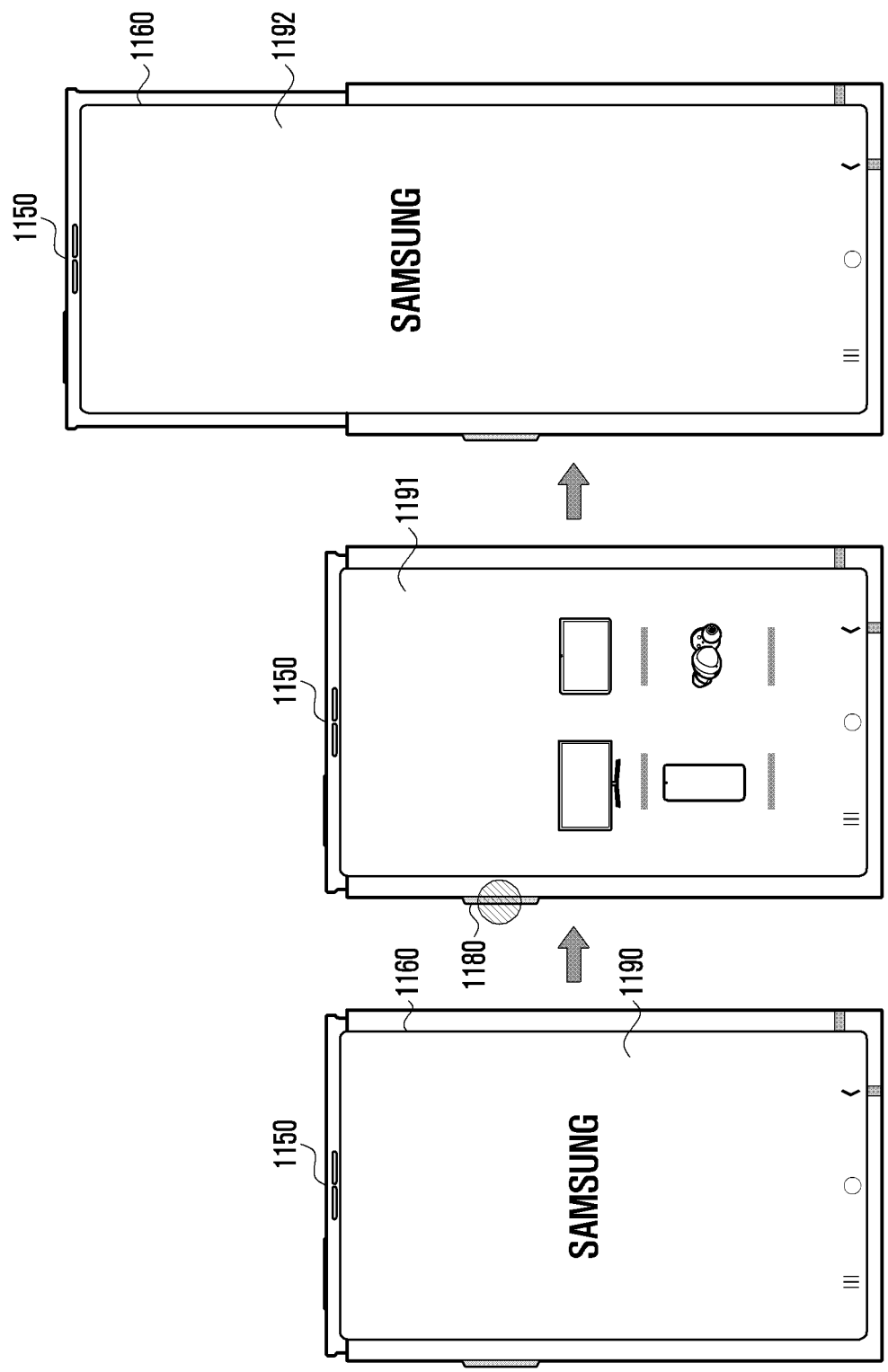

FIGS. 11A to 11C illustrate examples of an application that is re-executed when a display is changed.

Referring to FIG. 11A, a user of an electronic device 1100 is executing an application when a display 1110 is in the first state (e.g., the slide-in state), and a third page 1141 among several pages is currently executed. At this time, if the user presses a display switch trigger button 1130, the display 1110 may switch to the second state (e.g., may extend to the slide-out state), and since the application corresponds to an application that is re-executed when switching the display state, the application may be reset and re-executed so that a first page 1142, which is the first page, may be displayed on the display 1110 in the second state.

FIG. 11B illustrates an application in which the user's context is not maintained by returning to the initial screen as a result of re-execution of the application when switch the display state.

Referring to FIG. 11B, if a user of an electronic device 1150 initially executes an application, an application home screen 1190 may be displayed on a display 1160 and then switch to a product list screen 1191 according to the user's manipulation. If the user presses a display switch trigger button 1180 while the product list screen 1191 is being displayed, the display 1160 may slide out to be extended. Here, since the application is an application that is re-executed when the display is changed, the application may be reset and re-executed so that the application home screen 1192, which is initially displayed, may be displayed on the extended display 1160.

FIG. 11C illustrates an application in which a scroll position is not maintained because the current screen is refreshed as a result of re-execution of the application when switching the display state.

Referring to FIG. 11C, if the user executes an application to enter a scrollable screen, the uppermost portion of the entire screen may be displayed (1193). Thereafter, the user may scroll the screen down through touch and drag (1194). If the user presses a display switch trigger button in the state in which the screen is dragged down, the display may slide out to be extended. Here, since the application is an application that is re-executed when the display is changed, the current screen may be refreshed while being maintained so that the scroll position may be changed to the uppermost portion (1195).

As shown in FIGS. 11A to 11C, in the case of a specific application (or activity), the screen may be initialized or an undesired screen may be displayed after the user presses a trigger button to extend or reduce the display. This is against user's will and thus may cause inconvenience, and unnecessary expansion and reduction may lead to current consumption of a motor and power consumption of a display, which is a waste of system resource for the electronic device during the interaction between the electronic device and the user. Hereinafter, various embodiments of identifying whether or not an application is to be re-executed when the user triggers expansion or reduction while using the application, if it is identified that the application is to be re-executed, notifying the user of whether or not to proceed to an extension or reduction operation, and identifying the same, thereby providing continuity of user experience, will be described.

Figure 12:
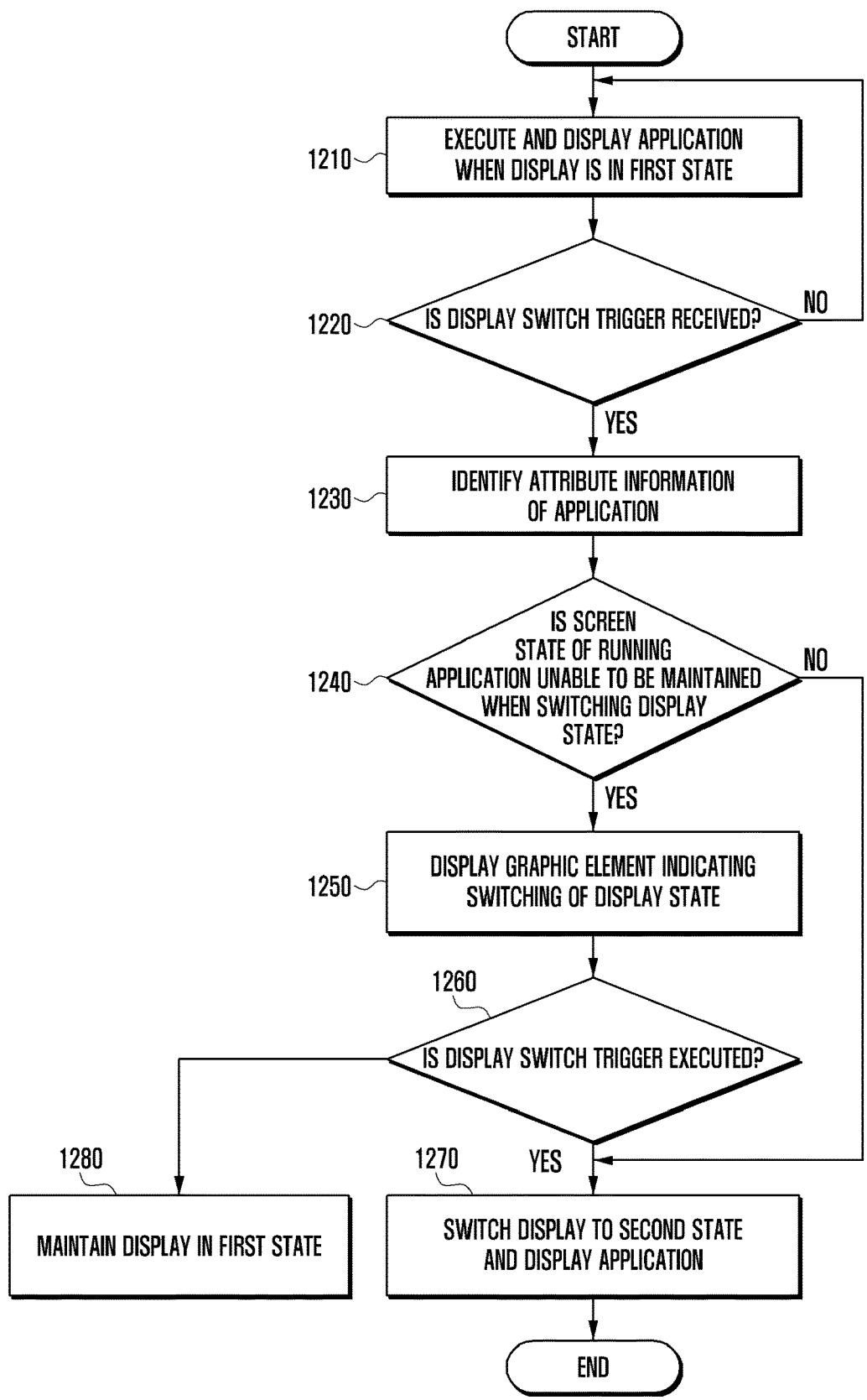
FIG. 12 illustrates a flowchart of a method of providing a user interface of an electronic device according to various embodiments.

FIG. 12 illustrates a flowchart of a method of providing a user interface of an electronic device according to various embodiments.

The illustrated method may be performed by the electronic device 101 or 900 described above with reference to FIGS. 1 and 9. The electronic device may include an extendable display having a structure capable of extension in a transverse direction (e.g., FIGS. 3A to 5) or extension in a longitudinal direction (e.g., FIGS. 6A to 8). Other type of electronic device having a different structure other than transversely/longitudinally extendable structure may be used to implement the user interface according to the present invention if the size of a display (or a screen) exposed to a user is variable.

According to various embodiments, in operation 1210, the electronic device (e.g., the processor 920 in FIG. 9) may execute and display an application when a display is in the first state. Here, the application may be an application (e.g., FIGS. 10A and 10B) that is not re-executed to maintain the current context even or an application that is re-executed (e.g., FIGS. 11A to 11C) when switching the state of the display, and even in the same application, re-execution thereof may vary depending on the activity constituting the current screen. Hereinafter, although a description will be made on the consumption that the first state is a slide-in state, various embodiments of the document may be implemented even in the case where the first state is regarded as a slide-out state and the second state is regarded as a slide-in state.

According to various embodiments, in operation 1220, the electronic device may detect a trigger event for switching the state of the display. For example, a user's physical input to a display switch trigger button disposed on the outer side of the housing of the electronic device may be detected.

According to various embodiments, in operation 1230, the electronic device may identify attribute information of an application or activity constituting a current screen of the application. The application may include attribute information of each activity, and the attribute information may be stored in a specific file (e.g., an extensible markup language (XML) file). For example, the attribute information may be stored in a manifest file, and in the case where changing a screen layout (screenLayout), changing an available screen size (screenSize), and changing a physical screen size (smallestScreenSize) are defined in the configuration changes (e.g., android:configChanges) of the manifest file, the activity may not be reset even when a corresponding event occurs, and configuration changes due to expansion or reduction of the display may be directly processed in the current activity.

Although it is illustrated in FIG. 12 that the operation of identifying the attributes of the application is performed after the occurrence of a display switch trigger event, various embodiments of this document are not limited thereto. For example, even if a display switch trigger event does not occur, the electronic device may identify attribute information of a currently running application or activity to determine in real time whether or not re-execution is to be performed when switching the state of the display.

According to various embodiments, in operation 1240, the electronic device may identify whether or not the screen state of the running application is able to be maintained when switching the state of the display. For example, if at least one of changing a screen layout (screenLayout), changing an available screen size (screenSize), and changing a physical screen size (smallestScreenSize) is not defined as a result of identifying the attribute information in operation 1230, the electronic device may identify that the application is to be re-executed due to switching of the display state so that the screen state is unable to be maintained.

According to various embodiments, if the screen state of the application is able to be maintained (or if the application is not to be re-executed) as a result of the identification in operation 1240, the electronic device may switch the display to the second state and display the application on the switched display in operation 1270. In this case, the electronic device may directly switch the display to the second state according to a trigger event, instead of displaying a separate graphic element.

According to various embodiments, if the screen state of the application is unable to be maintained (or the application is to be re-executed) as a result of the identification in operation 1240, the electronic device may display a UI or graphic element indicating switching of the display state and/or indicating that the application is to be re-executed in operation 1250. In this case, the electronic device may maintain the previous state of the display in the first state, and the application may be displayed in the same configuration as a previous one. The graphic element may be displayed in the form of a pop-up in the foreground of the application or in a specified area on the display. The graphic element may include text and/or image information including information stating that the application may be re-executed when switching the display state, buttons (e.g., a YES button and a NO button) for selecting whether or not to switch the state of the display, and/or information about the remaining time until switching (or maintaining) of the display state.

According to various embodiments, in operation 1260, the electronic device may identify whether or not a display switch trigger is re-executed while the UI or graphic element is being displayed. For example, if an input to a display switch trigger button or a touch onto the displayed graphic element is received, if an element (e.g., a YES button) for accepting the switching of the display state is selected, or if a specified time elapses after displaying the graphic element, the electronic device may identify that the display switch trigger has been re-executed.

According to various embodiments, if the display switch trigger is not re-executed, the electronic device may display the application remaining in the first state, instead of switching the display to the second state in operation 1280. If the display switch trigger is re-executed, the electronic device may switch the display to the second state and display the application on the extended or reduced display in operation 1270. In this case, the application may be reset and re-executed, thereby failing to maintain the previous context (e.g., FIGS. 11A to 11C).

Figure 13:
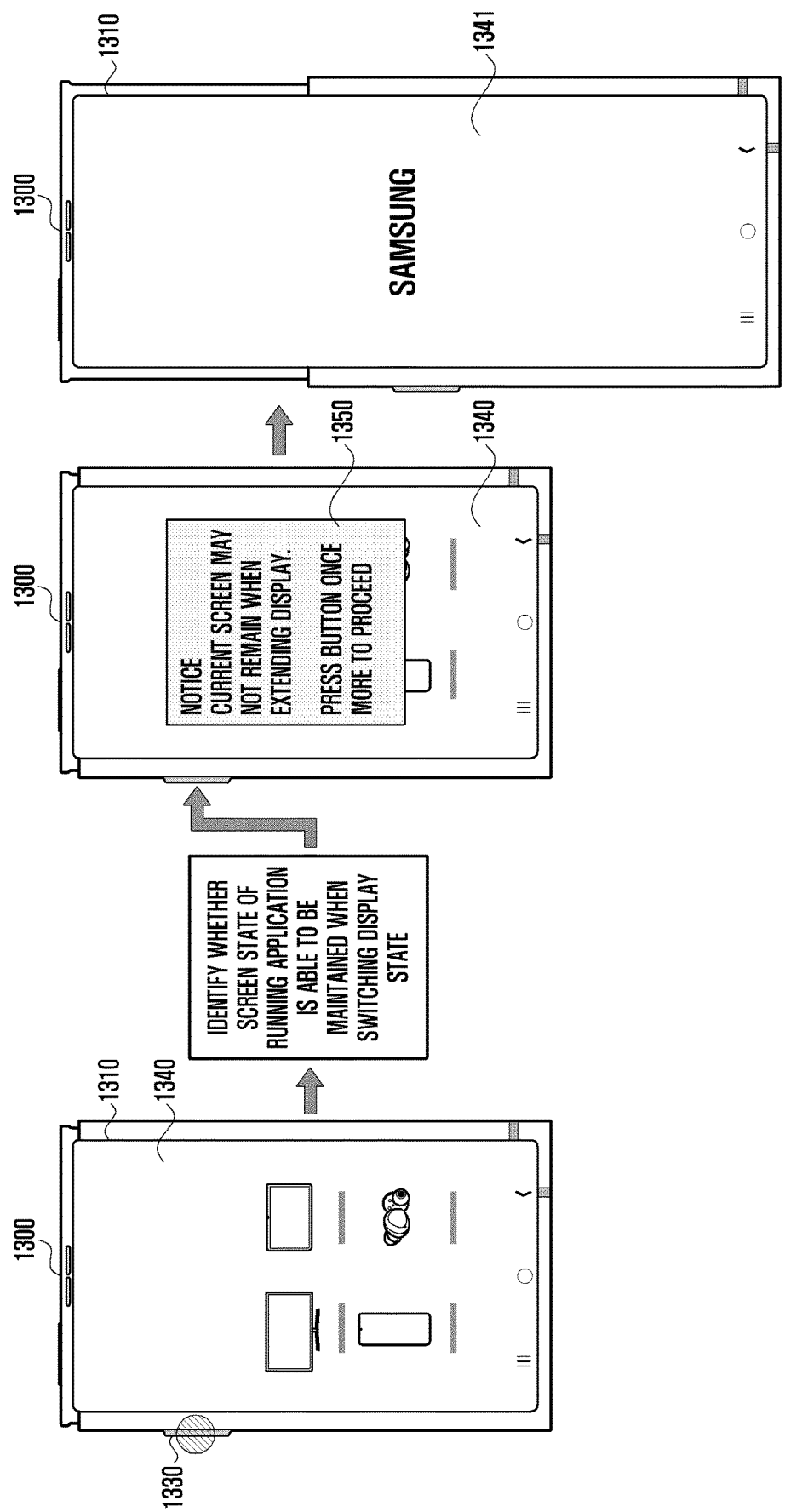
FIG. 13 is a diagram illustrating an example of a user interface for notifying of a change in a display state of an electronic device according to various embodiments.

FIG. 13 is a diagram illustrating an example of a user interface for notifying of a change in the display state of an electronic device according to various embodiments.

FIG. 13 may relate to an application described above with reference to FIG. 11B in which the display returns to the initial screen as a result of re-execution of the application when switching the display state so that the user's context is not maintained.

Referring to FIG. 13, when a display 1310 is in the slide-in state, the user may execute an application so that an application home screen is displayed, and then a product list screen 1340 may be displayed according to manipulation by the user. In this case, if the user presses a display switch trigger button 1330, an electronic device 1300 may identify whether or not the application is to be re-executed when switching the state of the display 1310. According to various embodiments, the electronic device 1300 may identify whether or not the application is to be re-executed (or whether or not the screen state is able to be maintained) when switching the display state from attribute information of the application or activity constituting the current screen 1340 of the application. For example, the electronic device 1300 may identify whether or not changing a screen layout (screenLayout), changing an available screen size (screen-Size), and changing a physical screen size (smallestScreen-Size) is defined in the configuration changes (e.g., android: configChanges) of a manifest file.

According to various embodiments, if it is identified that the application is to be re-executed when switching the state of the display 1310 as a result of identifying the attribute information of the application (or activity), the electronic device 1300 may display a graphic element 1350 indicating re-execution of the application on the display. As shown, the graphic element 1350 may be displayed in the form of a pop-up in the foreground of the application screen 1340 and may include text information including information stating that the application may be re-executed when switching the display state. In addition, the graphic element 1350 may include text information indicating switching of the state of the display (e.g., expansion or reduction of the display). The illustrated text information is only an example, and text information and image information of a variety of content and/or forms may be included. According to an embodiment, the graphic element 1350 may further include buttons (e.g., a YES button and a NO button) for selecting whether or not to switch the display state and/or information about the remaining time until the switching (or maintaining) of the display state.

According to various embodiments, in the state in which the graphic element 1350 is displayed, if a user input to the graphic element 1350 is received or if an input to the display switch trigger button 1330 is re-received, the display 1310 may slide out. Since the application is an application that is re-executed when switching the display state, a default application home screen 1341 may be displayed on the extended display 1310 when re-executed.

Figure 14:
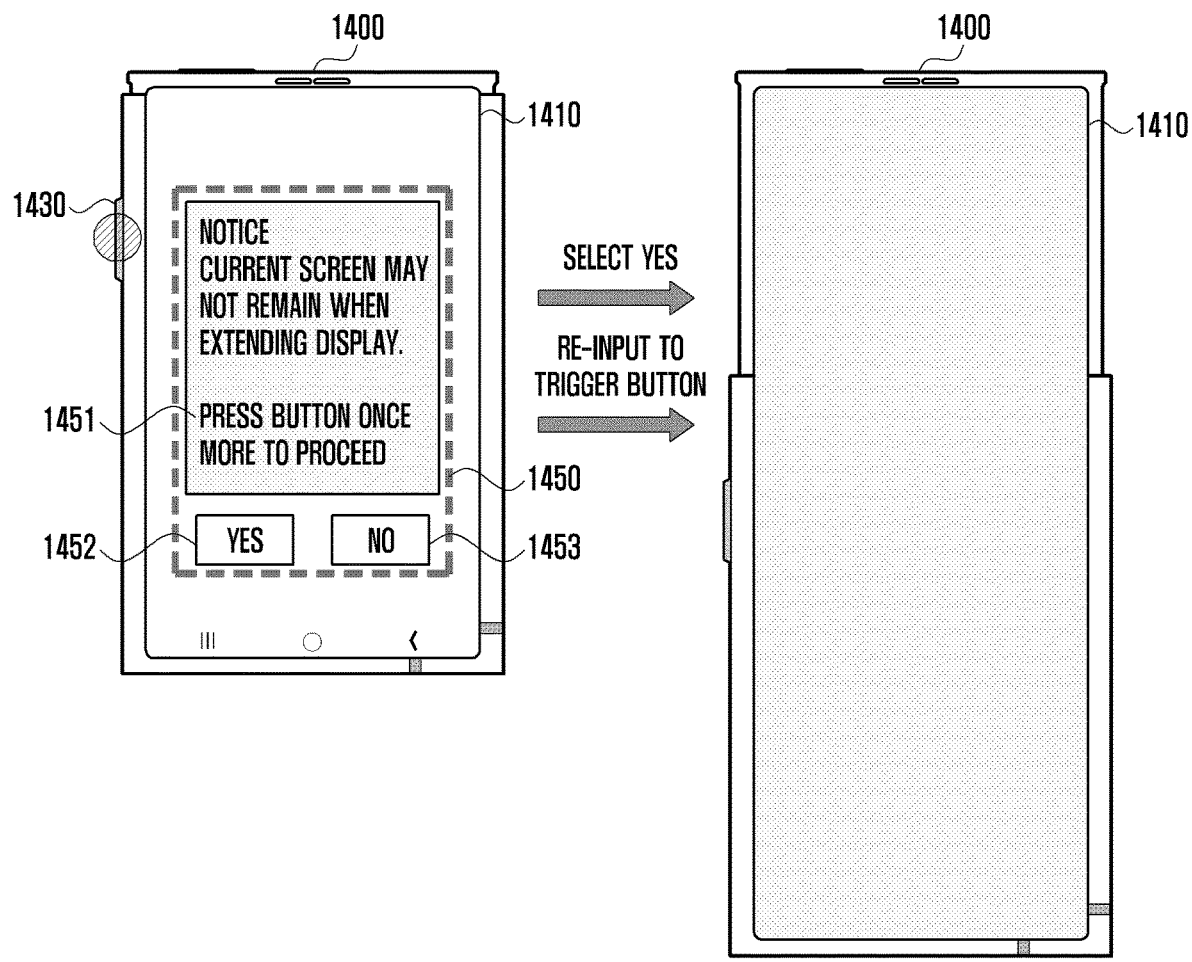
FIG. 14 illustrates an example of extending a display according to an event occurring after displaying a UI in an electronic device according to various embodiments.

FIG. 14 illustrates an example of extending a display according to an event occurring after displaying a UI in an electronic device according to various embodiments.

According to various embodiments, if it is identified that an application is to be re-executed (or that the screen state of the application is unable to be maintained) after a display switch trigger event is detected, an electronic device 1400 may display a graphic element 1450 indicating re-execution of the application. Referring to FIG. 14, the graphic element 1450 may include text information 1451 including information stating that the application may be re-executed when switching the display state, and a YES button 1452 and a NO button 1453 for selecting whether or not to switch the display state.

According to various embodiments, if the user selects the YES button 1452 or re-presses a display switch trigger button 1430 while the graphic element 1450 is being displayed, the electronic device 1400 may extend the display 1410 to the slide-out state. In this case, the display of the graphic element 1450 may be removed before switching the state of the display 1410, and the re-executed application may be displayed on the extended display 1410.

Figure 15:
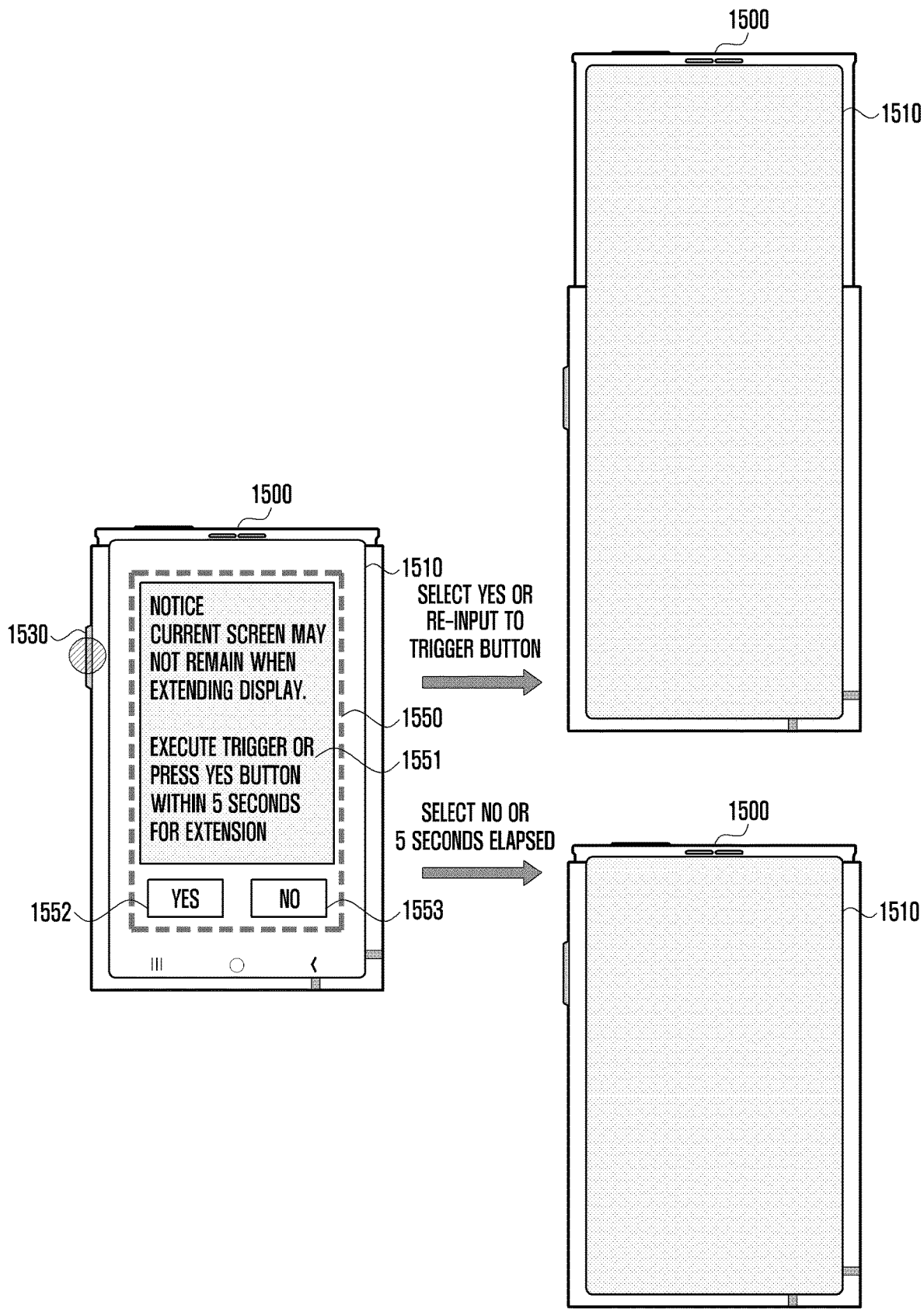
FIG. 15 illustrates an example of extending a display according to an event occurring after displaying a UI in an electronic device according to various embodiments.

FIG. 15 illustrates an example of extending a display according to an event occurring after displaying a UI in an electronic device according to various embodiments.

According to various embodiments, if it is identified that an application is to be re-executed (or that the screen state of the application is unable to be maintained) after a display switch trigger event is detected, an electronic device 1500 may display a graphic element 1550 indicating re-execution of the application. Referring to FIG. 15, the graphic element 1550 may include text information 1551 including information stating that the application may be re-executed when switching the display state and a specified time for input, and a YES button 1552 and a NO button 1553 for selecting whether or not to switch the display state.

According to various embodiments, if the user selects the YES button 1552 or re-presses a display switch trigger button 1530 while the graphic element 1550 is being displayed, the electronic device 1500 may extend the display 1510 to the slide-out state. In this case, the display of the graphic element 1550 may be removed before switching the state of the display 1510, and the re-executed application may be displayed on the extended display 1510.

According to various embodiments, if the user selects the NO button 1553 or if a specified time (5 seconds) elapses without any input while the graphic element 1550 is being displayed, the display switch trigger may be canceled, and the electronic device 1500 may continue to display the application remaining in the slide-in state.

Although it is illustrated in FIG. 15 that the display switch trigger is released when a specified time elapses, according to another embodiment, if a specified time elapses without any input, the electronic device 1500 may slide the display out as if the YES button is selected or re-input to the trigger button is made.

Although the operation of the processor in the case of detecting an event in which the electronic device switches from the slide-in state to the slide-out state has been described in FIGS. 13 to 15, various embodiments of this document may be applied in the same manner to the case of detecting an event in which the electronic device switches from the slide-out state to the slide-in state.

Figure 16:
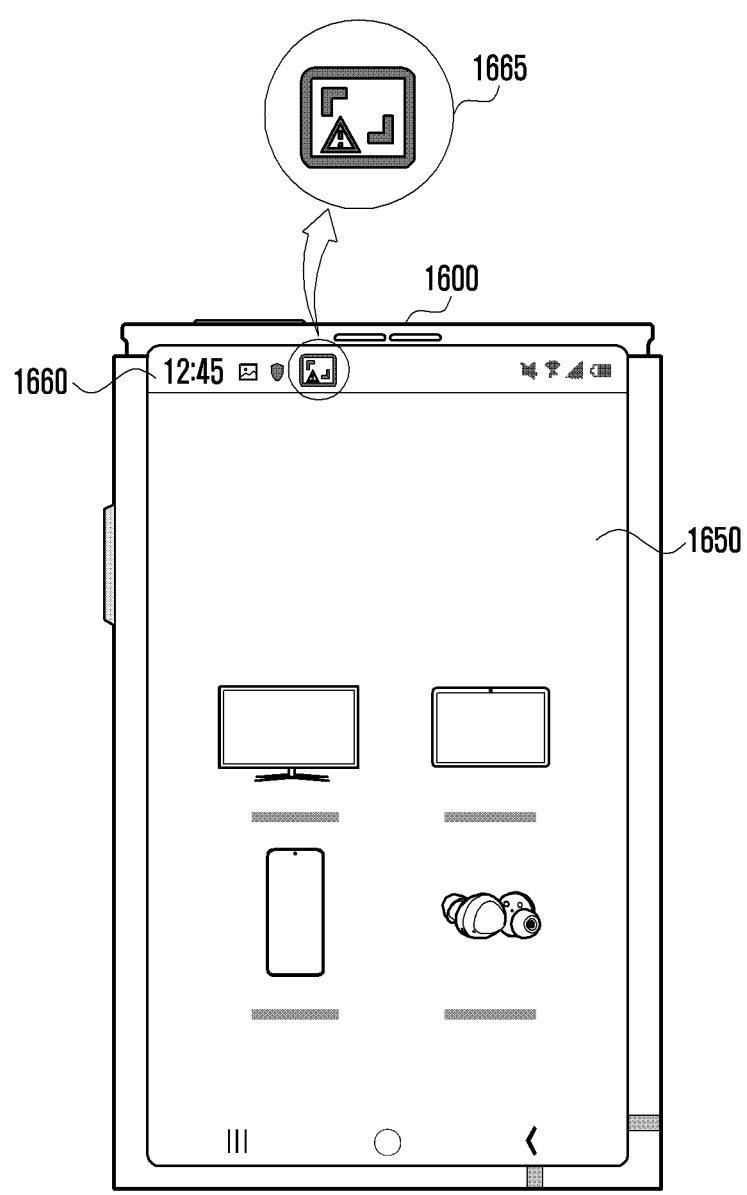
FIG. 16 illustrates an example of an icon indicating re-execution of an application in an electronic device according to various embodiments.

FIG. 16 illustrates an example of an icon indicating re-execution of an application in an electronic device according to various embodiments.

According to various embodiments, an electronic device 1600 may identify attribute information of a currently running application or activity to identify in real time whether or not the application is to be re-executed when switching the state of a display 1610 (e.g., switching from the slide-in state to the slide-out state or switching from the slide-out state to the slide-in state).

According to various embodiments, if it is identified that the currently running application is to be re-executed when switching the state of the display 1610, the electronic device 1600 may display an icon 1665 indicating the re-execution on at least a portion of the display.

Referring to FIG. 16, the electronic device 1600 may display an icon 1665 indicating the re-execution on a status bar 1660 at the top of the display 1610. The shape of the icon 1665 is not limited to the illustrated example, and various types of icons including information such as expansion/reduction of the display 1610 and a warning alarm may be provided. Alternatively, the electronic device 1600 may display text information indicating that the application is to be re-executed when switching the state of the display 1610 on the status bar 1660 or another area.

According to an embodiment, the icon 1665 may continue to be displayed until the screen switches to another application or activity or may disappear after being displayed for a predetermined time (e.g., 3 seconds). As the icon 1665 is displayed as described above, the user may recognize in advance the possibility of re-execution of the current screen before pressing a display switch trigger button.

An electronic device according to various embodiments may include a first housing, a second housing coupled to slide relative to the first housing, a rollable display in which a display area is reduced or extended based on sliding-in or sliding-out of the second housing, and a processor operatively coupled to the rollable display, wherein the processor may be configured to display a screen of a running application on the rollable display when the rollable display is in a first state, detect an input for switching the rollable display from the first state to the second state, in response to the input, determine whether or not a screen state of the running application is able to be maintained when switching the state of the rollable display, and if the application is unable to maintain the screen state of the running application when switching the state of the rollable display as a result of the determination, display a graphic element indicating switching of the state of the rollable display on the rollable display.

According to various embodiments, the electronic device may further include a display switch trigger button disposed on the outside of the first housing or the second housing, and the processor may be configured to detect, if an input to the display switch trigger button is received when the rollable display is in the first state, an input for switching from the first state to the second state.

According to various embodiments, the processor may be configured to determine, based on attribute information of an activity constituting a current screen of the running application, whether or not the application is able to maintain the screen state of the running application when switching the state of the rollable display.

According to various embodiments, the processor may be configured to determine, if the activity is configured not to be reset in the case of changing a screen layout, changing an available screen size, and changing a physical screen size in the attribute information of the activity, that the screen state of the running application is able to be maintained when switching the state of the rollable display.

According to various embodiments, the processor may be configured to identify whether or not the screen state of the running application is able to be maintained when switching the state of the rollable display, based on attribute information of the running application.

According to various embodiments, the processor may be configured to display the graphic element on the rollable display in the first state and, if a user input to the graphic element is received, switch the rollable display in the first state to the second state.

According to various embodiments, the processor may be configured to switch the rollable display in the first state to the second state if an input to the display switch trigger button is re-received while the graphic element is being displayed.

According to various embodiments, the processor may be configured to display the graphic element on the rollable display in the first state and, if a specified time elapses after displaying the graphic element, switch the rollable display in the first state to the second state.

According to various embodiments, the processor may be configured to maintain, if an input to the display switch trigger button or an input to the graphic element is not received for a specified time after displaying the graphic element, the rollable display remaining in the first state.

According to various embodiments, the processor may be configured to switch, if the screen state of the running application is able to be maintained when switching the state of the rollable display as a result of the determination, the rollable display to the second state and display the application on the rollable display in the second state.

According to various embodiments, the processor may be configured to display, if it is determined that the screen state of the running application is unable to be maintained when switching the state of the rollable display, an icon indicating switching of the screen state of the application on at least a portion of the rollable display.

According to various embodiments, wherein the rollable display may include a first part configured to be exposed to the outside through a front surface of the electronic device and a second part integrally coupled to the first part and configured to not exposed to the outside in the slide-in state and exposed to the outside in the slide-out state.

According to various embodiments, the first state may be a slide-in state in which the first part is exposed to the outside and in which the second part is not exposed to the outside, and the second state may be a slide-out state in which the first part and the second part are exposed to the outside.

According to various embodiments, a method of providing a user interface of an electronic device including a first housing, a second housing coupled to slide relative to the first housing, and a rollable display in which a display area is reduced or extended based on sliding-in or sliding-out of the second housing may include displaying a screen of a running application on the rollable display when the rollable display is in a first state, detecting an input for switching the rollable display from the first state to the second state, in response to the input, determining whether or not a screen state of the running application is able to be maintained when switching the state of the rollable display, and if the application is unable to maintain the screen state of the running application when switching the state of the rollable display as a result of the determination, displaying a graphic element indicating switching of the state of the rollable display on the display in the first state.

According to various embodiments, the determining whether or not the screen state of the running application is able to be maintained when switching the state of the rollable display may include identifying, based on attribute information of an activity constituting a current screen of the running application, whether or not the application is able to maintain the screen state of the running application when switching the state of the rollable display.

According to various embodiments, the determining whether or not the screen state of the running application is able to be maintained when switching the state of the rollable display may include determining, if the activity is configured not to be reset in the case of changing a screen layout, changing an available screen size, and changing a physical screen size in the attribute information of the activity, that the screen state of the running application is able to be maintained when switching the state of the rollable display.

According to various embodiments, the displaying of the graphic element may include displaying the graphic element on the rollable display in the first state and further include, if a user input to the graphic element is received, switching the rollable display in the first state to the second state.

According to various embodiments, the method may further include switching the rollable display in the first state to the second state if an input to a display switch trigger button is re-received while the graphic element is being displayed.

According to various embodiments, the method may further include, if a specified time elapses after displaying the graphic element, switching the rollable display in the first state to the second state.

According to various embodiments, the method may further include, if an input to a display switch trigger button or an input to the graphic element is not received for a specified time after displaying the graphic element, maintaining the rollable display remaining in the first state.

The invention claimed is:

1. An electronic device comprising:
a first housing;
a second housing coupled to slide relative to the first housing;
a display in which a display area exposed outside is reduced or extended based on sliding-in or sliding-out of the second housing;
memory, including one or more storage media, storing instructions; and
at least one processor including processing circuitry,
wherein the instructions, when executed by at least one processor individually or collectively, cause the electronic device to:
display an executed screen of an application on the display when the display is in a first state;
detect an input for changing the display from the first state to a second state in which a size of the display area exposed outside is different from the first state;
determine whether or not the application is re-executed based on the change in the size of the display area exposed outside; and
in case it is determined that the application is re-executed based on the change in the size of the display area, display a graphic element on the display that indicates a change in the executed screen.

2. The electronic device of claim 1, further comprising a display switch trigger button disposed on the outside of the first housing or the second housing,
wherein the instructions cause the electronic to detect, in case that an input to the display switch trigger button is received in case that the display is in the first state, an input for change from the first state to the second state.

3. The electronic device of claim 1, wherein the instructions cause the electronic device to determine, based on attribute information of an activity constituting the executed screen of the application, whether or not the application is re-executed based on the change in the size of the display area.

4. The electronic device of claim 3, wherein the instructions cause the electronic device to determine, in case that the activity is configured not to be reset in the case of changing a screen layout, changing an available screen size, and changing a physical screen size in the attribute information of the activity, that the application is not re-executed based on the change in the size of the display area.

5. The electronic device of claim 1, wherein the instructions cause the electronic device to identify whether or not the application is re-executed based on the change in the size of the display area, based on attribute information of the application.

6. The electronic device of claim 1, wherein the instructions cause the electronic device to:
display the graphic element on the display in the first state; and
in case that a user input to the graphic element is received, change the display in the first state to the second state.

7. The electronic device of claim 2, wherein the instructions cause the electronic device to change the display in the first state to the second state in case that an input to the display switch trigger button is re-received while the graphic element is being displayed.

8. The electronic device of claim 1, wherein the instructions cause the electronic device to:
display the graphic element on the display in the first state; and
in case that a specified time elapses after displaying the graphic element, change the display in the first state to the second state.

9. The electronic device of claim 2, wherein the instructions cause the electronic device to maintain, in case that an input to the display switch trigger button or an input to the graphic element is not received for a specified time after displaying the graphic element, the display remaining in the first state.

10. The electronic device of claim 1, wherein the instructions use the electronic device to change, in case that the application is not re-executed based on the change in the size of the display area, the display to the second state and display the application on the display in the second state.

11. The electronic device of claim 1, wherein the instructions cause the electronic device to display, based on determination that the application is re-executed based on the change in the size of the display area, an icon related to change of the state of the display on at least a portion of the display.

12. The electronic device of claim 11, wherein the display comprises:

a first part configured to be exposed to the outside through a front surface of the electronic device; and a second part integrally coupled to the first part and configured to not exposed to the outside in the slide-in state and exposed to the outside in the slide-out state.

13. The electronic device of claim 12, wherein the first state is a slide-in state in which the first part is exposed to the outside and in which the second part is not exposed to the outside, and wherein the second state is a slide-out state in which the first part and the second part are exposed to the outside.

14. A method of providing a user interface of an electronic device comprising a first housing, a second housing coupled to slide relative to the first housing, and a display in which a display area exposed outside is reduced or extended based on sliding-in or sliding-out of the second housing, the method comprising:

displaying an executed screen of an application on the display when the display is in a first state;

detecting an input for changing the display from the first state to a second state in which size of the display area exposed outside is different from the first state;

determining whether or not the application is re-executed based on the change in the size of the display area exposed outside; and in case it is determined that the application is re-executed based on the change in the size of the display area, displaying a graphic element that indicates a change in the executed screen.

15. The method of claim 14, wherein the determining whether or not the application is re-executed based on the change in the size of the display area comprises determining, based on attribute information of an activity constituting an executed screen of the application, whether or not the application is re-executed based on the change in the size of the display area.

16. The method of claim 15, wherein the determining whether or not the application is re-executed based on the change in the size of the display area comprises determining, in case that the activity is configured not to be reset in the case of changing a screen layout, changing an available screen size, and changing a physical screen size in the attribute information of the activity, that the application is not re-executed based on the change in the size of the display area.

17. The method of claim 14, wherein the displaying of the graphic element comprises displaying the graphic element on the display in the first state, and the method further comprises, in case that a user input to the graphic element is received, changing the display in the first state to the second state.

18. The method of claim 14, further comprising changing the display in the first state to the second state in case that an input to a display switch trigger button is re-received while the graphic element is being displayed.

19. The method of claim 14, further comprising, in case that a specified time elapses after displaying the graphic element, changing the display in the first state to the second state.

20. The method of claim 14, further comprising, in case that an input to a display switch trigger button or an input to the graphic element is not received for a specified time after displaying the graphic element, maintaining the display remaining in the first state.

\* \* \* \* \*